(12) United States Patent
Dorfman

(10) Patent No.: US 10,220,330 B2
(45) Date of Patent: *Mar. 5, 2019

(54) WATER DISPENSER SYSTEM AND METHOD

(71) Applicant: Skywell, LLC, Los Angeles, CA (US)

(72) Inventor: Ronald M. Dorfman, Los Angeles, CA (US)

(73) Assignee: Skywell, LLC, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/712,037

(22) Filed: Sep. 21, 2017

(65) Prior Publication Data
US 2018/0008905 A1    Jan. 11, 2018

Related U.S. Application Data

(63) Continuation of application No. 15/217,971, filed on Jul. 23, 2016, now Pat. No. 9,795,895, which is a
(Continued)

(51) Int. Cl.
*B01D 5/00* (2006.01)
*C02F 1/78* (2006.01)
(Continued)

(52) U.S. Cl.
CPC ........... B01D 5/009 (2013.01); B01D 5/0003 (2013.01); B01D 5/0006 (2013.01);
(Continued)

(58) Field of Classification Search
CPC .... B01D 5/009; B01D 5/0003; B01D 5/0006; B01D 5/0051; C02F 1/78; C02F 2303/04; C02F 2307/10; F24F 3/1405; E03B 3/28
See application file for complete search history.

(56) References Cited

U.S. PATENT DOCUMENTS 2,996,897 A    8/1961  Grimes
4,255,937 A    3/1981  Ehrlich
(Continued)

FOREIGN PATENT DOCUMENTS

AU    2008202279 A1 *  12/2008
AU    20080202279 A1   12/2008
(Continued)

OTHER PUBLICATIONS

Poyet, Device for Extracting Water . . . , Sep. 29, 2011, WO2011117841A1, Whole Document.*
(Continued)

Primary Examiner — Larry Furdge
(74) Attorney, Agent, or Firm — Lance M. Pritikin, Esq.

(57) ABSTRACT

Atmospheric water generators, systems and methods are presented involve user authentication, recording and tracking of water volumes dispensed by respective users over periods of various lengths, controlling component noise level and timing, and cleaning, heating and cooling the collected water more efficiently. The generators may be placed in network communication with other such generators to exchange water availability information therewith, or may communicate with a central server element by way of LAN, Internet, cell tower, peer-to-peer mesh or satellite. Information is conveyed to the user regarding the amount of water they consume from the water generators, and their resulting positive impact on the environment. Water dispensing data may be shared on the users' social media accounts, or used as inputs for competitions or games in order to further engage the user. User authentication may be accomplished by way of biometrics or an RFID/NFC tag embedded in the user's water vessel.

29 Claims, 25 Drawing Sheets

Related U.S. Application Data continuation of application No. 14/787,747, filed as application No. PCT/US2014/059778 on Oct. 8, 2014, now Pat. No. 9,561,451.

(60) Provisional application No. 61/888,470, filed on Oct. 8, 2013, provisional application No. 61/984,723, filed on Apr. 25, 2014.

(51) Int. Cl.
*E03B 3/28* (2006.01)
*F24F 3/14* (2006.01)

(52) U.S. Cl.
CPC .............. *B01D 5/0051* (2013.01); *C02F 1/78* (2013.01); *E03B 3/28* (2013.01); *F24F 3/1405* (2013.01); *C02F 2303/04* (2013.01); *C02F 2307/10* (2013.01)

(56) References Cited

U.S. PATENT DOCUMENTS

| | | | |
|---|---|---|---|
| 4,415,797 A | 11/1983 | Choustoulakis | |
| 5,038,752 A | 8/1991 | Anson | |
| 5,106,512 A | 4/1992 | Reidy | |
| 5,149,446 A | 9/1992 | Reidy | |
| 5,203,989 A | 4/1993 | Reidy | |
| 5,259,203 A | 11/1993 | Engel et al. | |
| 5,301,516 A | 4/1994 | Poindexter | |
| 5,398,517 A | 3/1995 | Poindexter | |
| 5,553,459 A | 9/1996 | Harrison | |
| 5,669,221 A | 9/1997 | LeBleu et al. | |
| 5,701,749 A | 12/1997 | Zakryk | |
| 5,766,453 A | 6/1998 | Morellato et al. | |
| 5,845,504 A | 12/1998 | LeBleu | |
| 5,857,344 A | 1/1999 | Rosenthal | |
| 6,029,461 A | 2/2000 | Zakryk | |
| 6,058,718 A | 5/2000 | Forsberg et al. | |
| 6,182,453 B1 | 2/2001 | Forsberg | |
| 6,209,337 B1 | 4/2001 | Edwards | |
| 6,212,959 B1 | 4/2001 | Perkins | |
| 6,237,352 B1 | 5/2001 | Goodchild | |
| 6,289,689 B1 | 9/2001 | Zakryk | |
| 6,490,879 B1 | 12/2002 | Lloyd et al. | |
| 6,505,477 B1 | 1/2003 | Smith et al. | |
| 6,588,225 B1 | 7/2003 | Hodgson et al. | |
| 6,644,060 B1 | 11/2003 | Dagan | |
| 6,684,648 B2 | 2/2004 | Faqih | |
| 6,705,104 B2 | 3/2004 | Tani et al. | |
| 6,755,037 B2 | 6/2004 | Engel et al. | |
| 6,779,358 B2 | 8/2004 | Zakryk et al. | |
| 6,988,641 B2 | 1/2006 | Jones et al. | |
| 7,000,410 B2 | 2/2006 | Hutchinson | |
| 7,089,763 B2 | 8/2006 | Forsberg et al. | |
| 7,272,947 B2 | 9/2007 | Anderson et al. | |
| 7,357,001 B2 | 4/2008 | Yoon | |
| 7,373,787 B2 | 5/2008 | Forsberg et al. | |
| 7,540,167 B2 | 6/2009 | Murphy et al. | |
| 7,779,643 B2 | 8/2010 | Simons | |
| 7,861,544 B2 | 1/2011 | Ferreira et al. | |
| 7,886,557 B2 | 2/2011 | Anderson et al. | |
| 7,954,335 B2 | 6/2011 | Hill et al. | |
| 8,028,536 B2 | 10/2011 | Morgan et al. | |
| 8,075,652 B2 | 12/2011 | Melikyan | |
| 8,302,412 B2 | 11/2012 | Tieleman et al. | |
| 8,398,733 B2 | 3/2013 | Melikyan | |
| 2002/0011075 A1 | 1/2002 | Faqih | |
| 2002/0143860 A1 | 10/2002 | Catan | |
| 2002/0194069 A1 | 12/2002 | Thakur et al. | |
| 2005/0284167 A1 | 12/2005 | Morgan et al. | |
| 2006/0011144 A1* | 1/2006 | Kates | A01K 15/02 119/719 |
| 2006/0165060 A1 | 7/2006 | Dua | |
| 2007/0175234 A1 | 8/2007 | Pruitt | |
| 2007/0209984 A1 | 9/2007 | Lev et al. | |
| 2008/0184720 A1 | 8/2008 | Morgan et al. | |
| 2008/0276630 A1 | 11/2008 | Lukitobudi | |
| 2009/0029769 A1* | 1/2009 | Muller | A63F 13/10 463/31 |
| 2009/0077992 A1 | 3/2009 | Anderson et al. | |
| 2010/0005825 A1 | 1/2010 | Yui | |
| 2010/0083676 A1 | 4/2010 | Merritt | |
| 2010/0307181 A1 | 12/2010 | Max | |
| 2011/0147194 A1* | 6/2011 | Kamen | B01D 1/0082 202/185.1 |
| 2011/0283730 A1 | 11/2011 | Tudor | |
| 2012/0048119 A1 | 3/2012 | Morgan et al. | |
| 2012/0060531 A1 | 3/2012 | Ferreira et al. | |
| 2013/0008196 A1 | 1/2013 | Poyet | |
| 2013/0042642 A1 | 2/2013 | Ferreira et al. | |
| 2013/0047655 A1 | 2/2013 | White | |
| 2013/0209972 A1 | 8/2013 | Carter et al. | |
| 2013/0333405 A1 | 12/2013 | Belady et al. | |
| 2014/0231348 A1 | 8/2014 | Sackstein | |

FOREIGN PATENT DOCUMENTS

| | | | |
|---|---|---|---|
| CA | 2341106 C | 10/2001 | |
| CN | 103750745 A | 4/2014 | |
| EP | 1852131 B1 | 10/2010 | |
| EP | 2607323 A1 | 6/2013 | |
| EP | 2918929 A1 | 9/2015 | |
| FR | WO2011117841 A1 * | 9/2011 | |
| JP | H05174036 A * | 7/1993 | |
| JP | H05174036 A | 7/1993 | |
| JP | 2007233769 A * | 9/2007 | |
| JP | 2007233769 A | 9/2007 | |
| JP | 2008519189 A | 6/2008 | |
| JP | 2013056699 A | 3/2013 | |
| KR | 100735515 B1 | 6/2007 | |
| KR | 100884905 B1 | 2/2009 | |
| KR | 20100058947 A | 6/2010 | |
| KR | 20100058947 A * | 6/2010 | |
| WO | 2006049387 A1 | 5/2006 | |
| WO | 2011117841 A1 | 9/2011 | |
| WO | 2011135403 A1 | 11/2011 | |
| WO | 2012009024 A1 | 1/2012 | |
| WO | 2012165775 A2 | 12/2012 | |
| WO | 2014203634 A1 | 12/2014 | |

OTHER PUBLICATIONS

Numano et al., Water Supply/Distribution Control System, Jul. 13, 1993, JPH05174036A, Whole Document.*

Calder, System and Method for Regulating a Supply of Water, Dec. 18, 2008, AU2008202279A1, Whole Document.*

Tsukada, Personal Identification User Interface Device, Sep. 13, 2007, JP2007233769A, Whole Document.*

Kang et al., Water Purification Extraction System . . . , Jun. 4, 2010, KR20100058947A, Whole Document.*

* cited by examiner

WATER DISPENSER SYSTEM AND METHOD

RELATED APPLICATIONS

This application is a continuation of U.S. patent application Ser. No. 15/217,971 filed Jul. 23, 2016, which is a continuation of U.S. patent application Ser. No. 14/787,747 filed Oct. 28, 2015, now U.S. Pat. No. 9,561,451, which is a U.S. National Stage of International Application No. PCT/US14/59778, filed on Oct. 8, 2014, which claims the benefit of U.S. Provisional Application No. 61/888,470 filed Oct. 8, 2013, and U.S. Provisional Patent Application No. 61/984,723 filed Apr. 25, 2014. All of the above-identified applications are hereby incorporated by reference in their entireties as though fully and completely set forth herein.

TECHNICAL FIELD

The present invention relates generally to devices for capturing atmospheric water and dispensing such water in potable form. More particularly, the present invention relates to portable atmospheric water generators with features directed to improving efficiency, temperature control and noise control, and facilitating user interactivity.

BACKGROUND

Systems for converting atmospheric moisture into potable drinking water have existed for decades. However, widespread consumer acceptance of such systems is still lacking, largely due to their operational inefficiencies, noise, concerns with cleanliness, and a general lack of user engagement. One primary challenge with portable atmospheric water generators (AWGs) has been ensuring that the water dispensed from the machine is potable. Early versions of portable AWGs for drinking water applications relied on various forms of filtration and recirculation as the primary means of controlling bacterial growth.

What is needed is an improved portable atmospheric water generator which produces cleaner water at desired temperatures and humidity levels more efficiently, includes convenient noise and energy control functionality, all while engaging the user in a manner which ensures their continued use of the machine.

SUMMARY

Certain deficiencies of the prior art are overcome by the provision of atmospheric water generators, systems and methods in accordance with the present invention. Embodiments provide more efficient water heating and cooling, substantially improved bacteriostatic features, the ability to conveniently control noise and energy consumption, and components and processes to engage and motivate the user. Certain features and functionality discussed herein may be as applicable to large industrial or commercial AWGs as they are to portable (e.g., home/office) versions.

Embodiments allow users to be recognized by the generator, by authenticating either before or after dispensing water. User authentication may be verified with the machine database or a cloud service in network communication with the generator. Water dispensing information may be added to the user hydration profile and synced with cloud services. Analysis services may provide behavioral or health insight to users based on water consumption information. Such analysis may be sent to the user based on their pre-selected notification preferences or sold to third party services such as ad services or direct marketers.

The user profile authentication systems of the present invention may be active or passive. Active authentication may rely upon a dedicated action to authenticate, for example, entering a username and password. In contrast, passive authentication may be integrated with the dispenser itself, for example, by using finger print scanners integrated into the dispense buttons or via RFID/NFC tags attached or integrated into the user's water vessel. Authentication of a particular user may modify machine behavior, for example, to provide customized water via pre-selected temperature control or pre-selected additives.

In embodiments of the invention, users' profiles may be integrated with various social media platforms to facilitate behavior sharing, social marketing or to modify behavior by way of presenting healthy challenges. The user's dispensation may optionally by posted to social media sites. Embodiments enable users to challenge one another to achieve usage statistics such as ounces consumed this week, bottles saved this month, and the like. Such posts, challenges, or resulting comments may be integrated into the various interfaces (e.g., machine, mobile, web) which form art of or are associated with embodiments of the present invention Embodiments of the portable atmospheric water generator described herein may report service-related machine usage information including filter lifespan to cloud services for analysis. Machine servicing requirements may be sent to the client or to service personal if automatic scheduling is requested by the client.

In embodiments, scheduling interfaces on the machine, mobile app, and website allow an administrator to modify water generation times. Analysis services may use this information to suggest generation scheduling adjustments or confirm ideal machine placement based on expected water output versus actual output experienced by the client.

The generator may be branded or customized to, for example, meet the individual needs of the client. Such customization may be managed via mobile or web interfaces. The generator may periodically update its functionality using, for example, Wi-Fi or cellular technologies.

BRIEF DESCRIPTION OF THE DRAWINGS

Further advantages of the present invention may become apparent to those skilled in the art with the benefit of the following detailed description of the preferred embodiments and upon reference to the accompanying drawings in which.

DETAILED DESCRIPTION OF THE PREFERRED EMBODIMENTS

Figure 1:
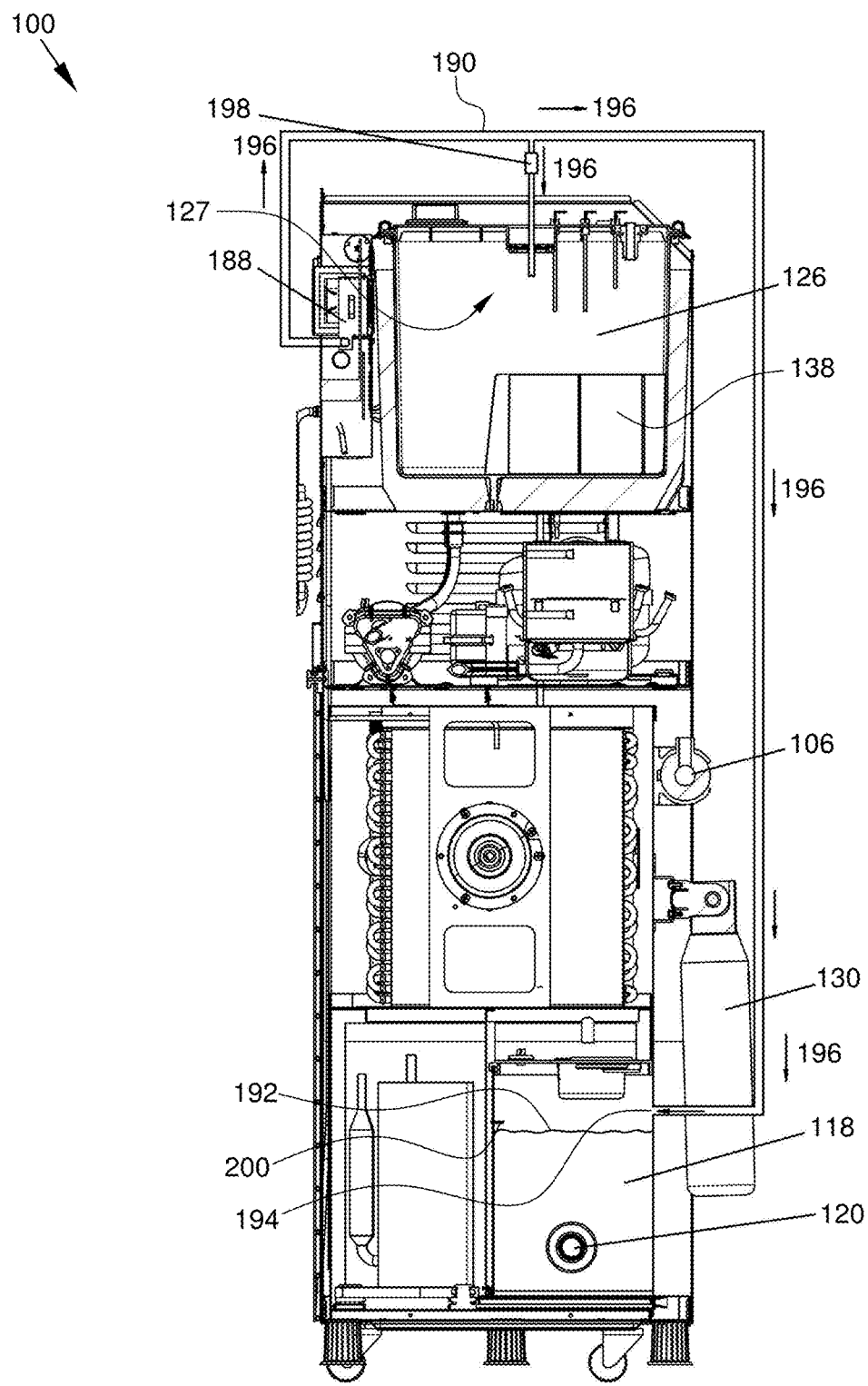
FIG. 1 is a schematic side view of a system in accordance with the present invention, illustrating an ozone generation and delivery approach.

Referring now to the drawings, like reference numerals designate identical or corresponding features throughout the several views.

Described herein are certain non-limiting embodiments of an atmospheric water generator 100 for operating in an environment with ambient air and generating potable water therefrom. A portable version of the atmospheric water generator 100 may comprise a water production element, at least one tap element 144 and a computer element 150. The water production element is preferably configured to transform water vapor from the ambient air to liquid water. Depending upon the particular embodiment of the generator 100, the respective water production element may comprise a dehumidification subsystem, a desiccant subsystem, an adiabatic subsystem, some combination or the like A dehumidification subsystem typically involves a compressor 114 circulating refrigerant through a condenser 116 and then an evaporator coil which cools the air surrounding it. This lowers the air temperature to its dew point, causing water vapor to condense. Filtered air is typically moved over the evaporator coil by a fan 180. A desiccant subsystem typically involves a wet desiccation process whereby salt in a concentrated brine solution is used to absorb ambient humidity. An adiabatic subsystem typically involves a heat exchanger which transfers the heat from one fluid to another. For example, a typical adiabatic wheel heat exchanger is made up of a large wheel with threads which rotate through the hot and cold fluids to extract or transfer heat.

The at least one tap element 144 may be in water receiving communication with the water production element may be user-actuatable between an open state and a closed state. Such user actuation may not be direct. Rather, it may be accomplished by way of electronic button controls (e.g., 108 and 110), solenoids, pushrods and the like. The at least one tap element 144 may be configured to allow water to be dispensed therefrom when in its open state and to prevent water from being dispensed therefrom when in its closed state. A hot water lockout button 112 may be provided to prevent hot water from being dispensed.

Figure 11:
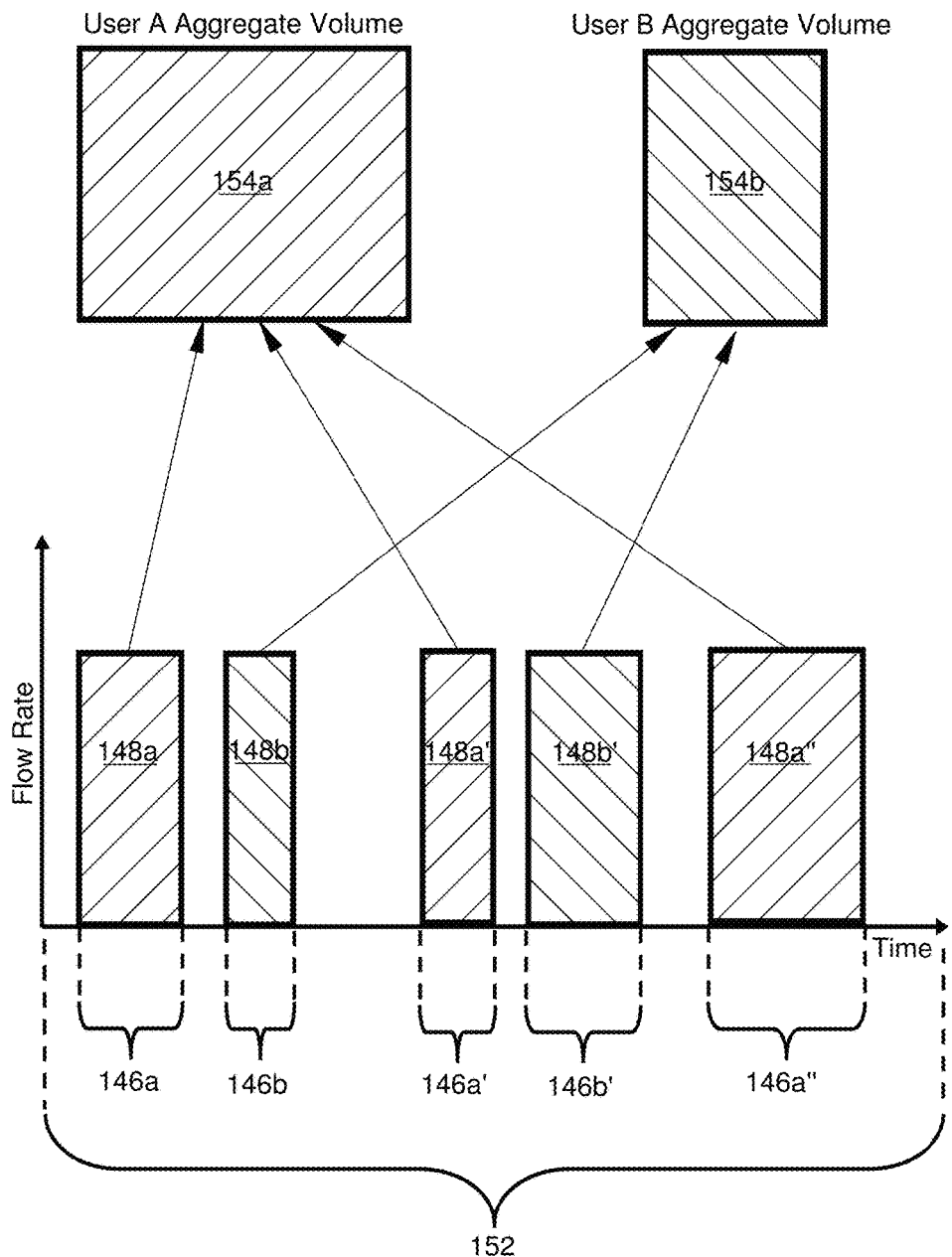
FIG. 11 is a diagrammatic chart illustrating one example of the relationship between a dispensing period, actuation periods, actuated volumes and respective user aggregate volumes.
Figure 12:
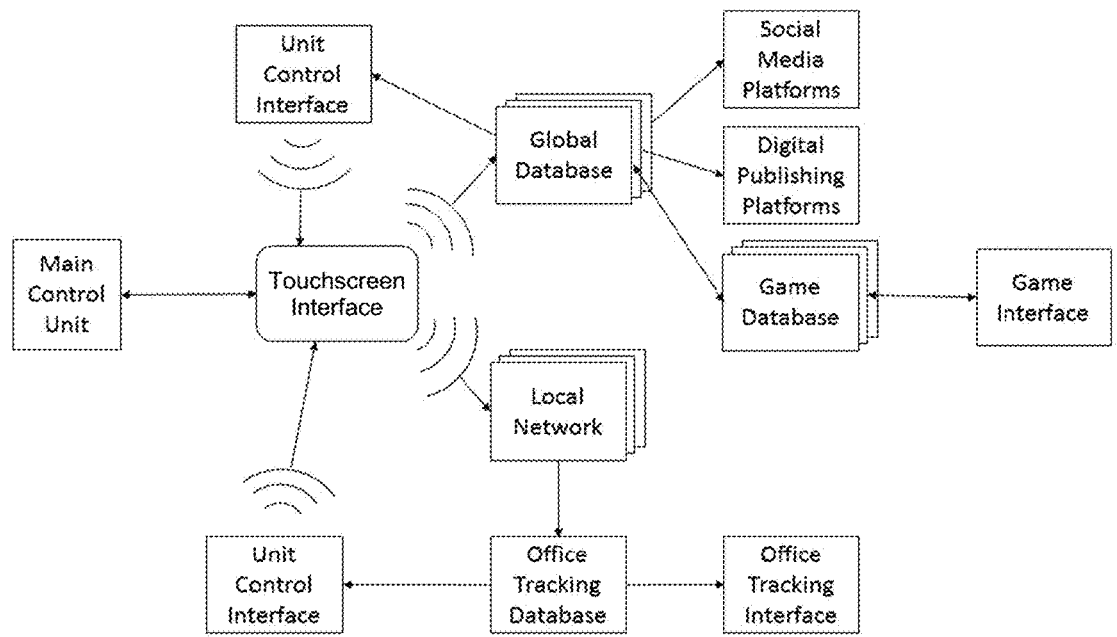
FIG. 12 is a diagrammatic block diagram depicting network connectivity of one or more non-limiting embodiments of the present invention.

Referring to FIG. 11 for illustration, actuation periods (such as those shown at 146a and 146b, for example) may be respectively defined by each length of time the at least one tap element 144 is continuously in its open state. Actuated volumes of water (such as those shown at 148a and 148b for example) are respectively defined by the volume of water dispensed during each actuation period. With reference to FIG. 11, over the course of a particular dispensing period 152, User A has triggered three different actuation periods (146a, 146a' and 146a") by actuating the tap 144. Similarly, over the same dispensing period 152, User B has triggered two different actuation periods (146b and 146b'). As a result, respective actuation volumes (148a, 148a', 148a", 148b and 148b') of water have been dispensed by Users A and B from the generator 100 during the dispensing period 152.

In particular embodiments, the computer element 150 may include a respective processor, memory, machine database and display screen. The computer element 150 may preferably be configured to: (i) register one or more registered users of the generator; (ii) record the actuated volumes dispensed by respective registered users; (iii) for each registered user, sum the respective actuated volumes dispensed throughout respective user dispensing periods, thereby defining respective user aggregate volumes; and (iv) convey respective user aggregate volumes to one or more of the registered users. With reference again to FIG. 11, User A's aggregate volume 154a represents the sum of User A's actuation volumes dispensed over the respective dispensing period 152. Similarly, User B's aggregate volume 154b represents the sum of User B's actuation volumes dispensed over the respective dispensing period 152.

In certain preferred embodiments, the user aggregate volumes 154 are conveyed in the form of at least one of: (a) one or more standard units of volume measurement; (b) a degree of progress toward a pre-set goal of the respective registered user; (c) a degree of progress toward a pre-set group goal of a group of the respective registered users; and (d) a number of hypothetical plastic containers of pre-determined volumetric capacity which are collectively volumetrically equivalent to the respective user aggregate volume.

In particular preferred embodiments, the computer element 150 includes a display screen 102, and the conveying of user aggregate volumes 154 is completed at least by way of displaying the respective aggregate volumes 154 on the display screen 102. By way of example, the computer element may be or may comprise a tablet computer with a touch-screen interface. Thus, the role of the display screen may be performed by the touch screen interface of such a computing device.

Certain embodiments of a generator 100 may further comprise one or more sensor elements (not shown) configured to measure one or more of the ambient temperature, ambient pressure and ambient humidity. In such embodiments, the computer element 150 may be in data communication with the one or more sensor elements and configured to: (a) calculate from the data a current rate at which the generator 100 is able to produce liquid water from the ambient air; and (b) display the rate on the display screen 102.

Particular preferred embodiments of a generator 100 comprise a network interface (software or hardware) configured to enable the computer element 150 to communicate with at least one of a local area network (LAN), a wide area network (WAN), a cellular network, a peer-to-peer mesh and a satellite. Such communications may preferably include wireless communication.

In network-capable embodiments of generators 100, the computer element 150 may be configured to receive by way of the network interface for display on the display screen at least one or more of: (i) educational or motivational messages relating to water use; (ii) educational or motivational messages relating to water conservation; (iii) graphics, messages or promotions relating to a brand; and (iv) service notifications.

In embodiments, the conveyed user aggregate volumes may be accessible by social media accounts of respective registered users. Such access may be driven by the actions of the server element of embodiments of the present invention, the actions of the social media servers or software, or a combination thereof. Alternatively or in addition, in particular embodiments the conveyed user aggregate volumes may be conveyable as data inputs to a computer-based game playable by one or more registered users. In such embodiments, the respective aggregate volumes may have the effect of triggering events within the game (e.g., shielding the protagonist, making resources or options available, adding lives, etc.), and/or representing parameters within the game (e.g. speed, power level, currency, etc.). In yet further embodiments, the conveyed user aggregate volumes may be conveyable as data inputs to a computer-based competition between registered users wherein the respective aggregate volumes of the competitors are used as a basis of mutual performance comparison. For example, whichever competitor/user consumes the most water or saves the most hypothetical plastic bottles within a selected dispensing period wins.

Figure 18:
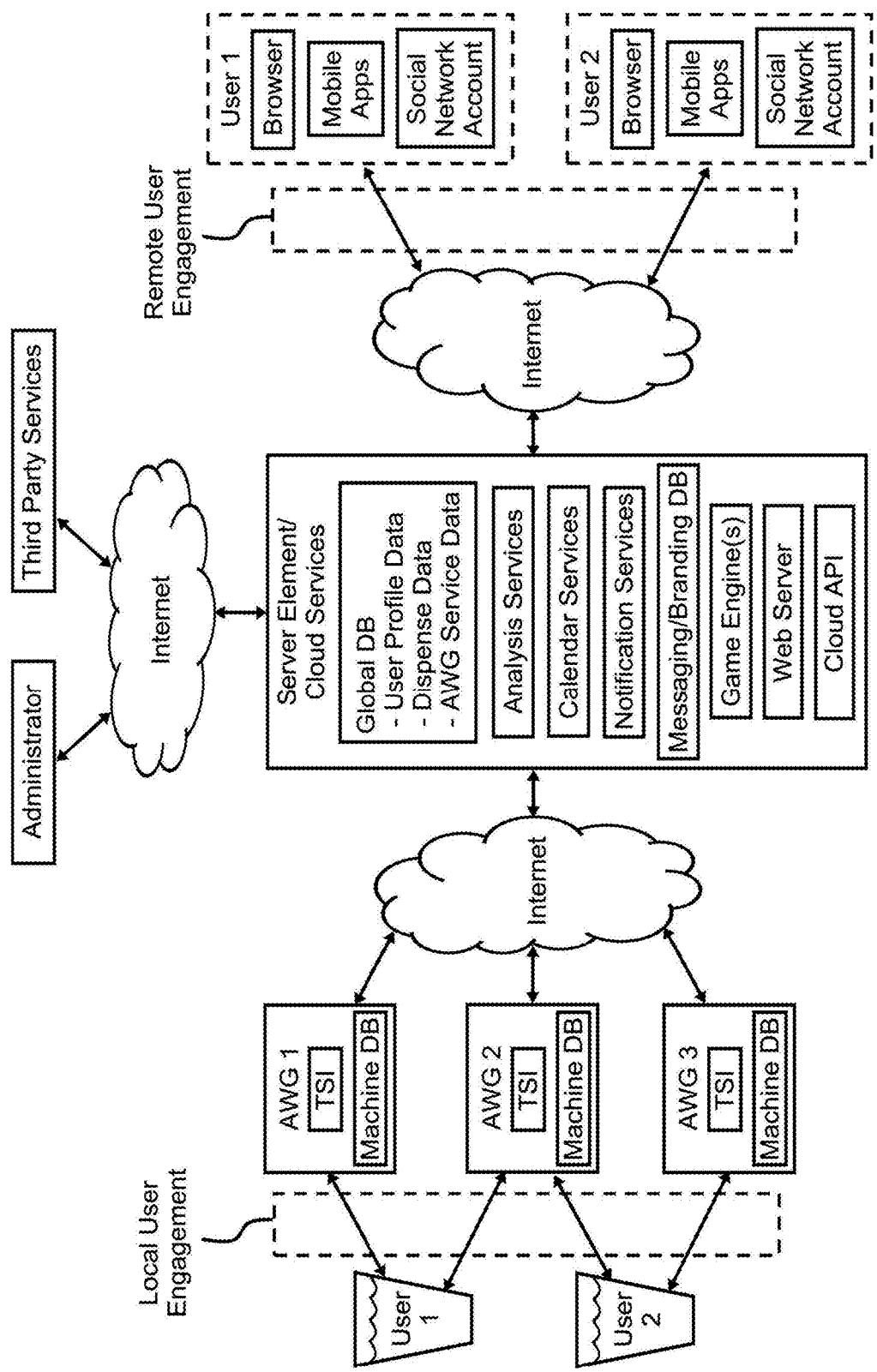
FIG. 18 is a schematic view of the system architecture in accordance with certain embodiment of the present invention.
Figure 19:
FIG. 19 is a wireframe view of an embodiment of a Dashboard for presentation on the display screen of a portable atmospheric water generator.
Figure 20:
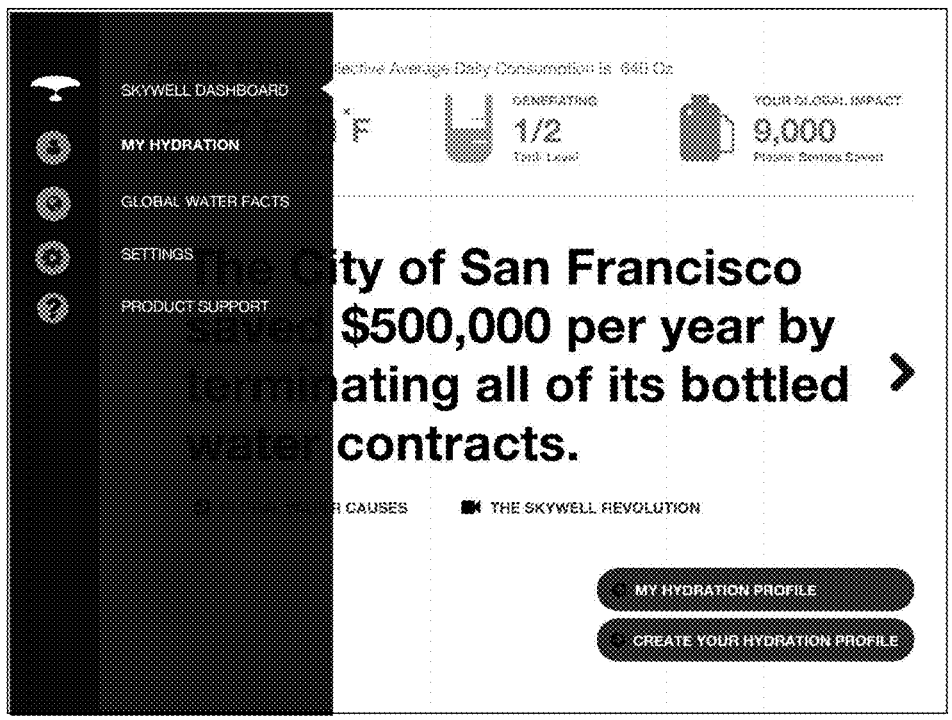
FIG. 20 is a wireframe view of an embodiment of a Dashboard with Navigation Screen open.
Figure 21:
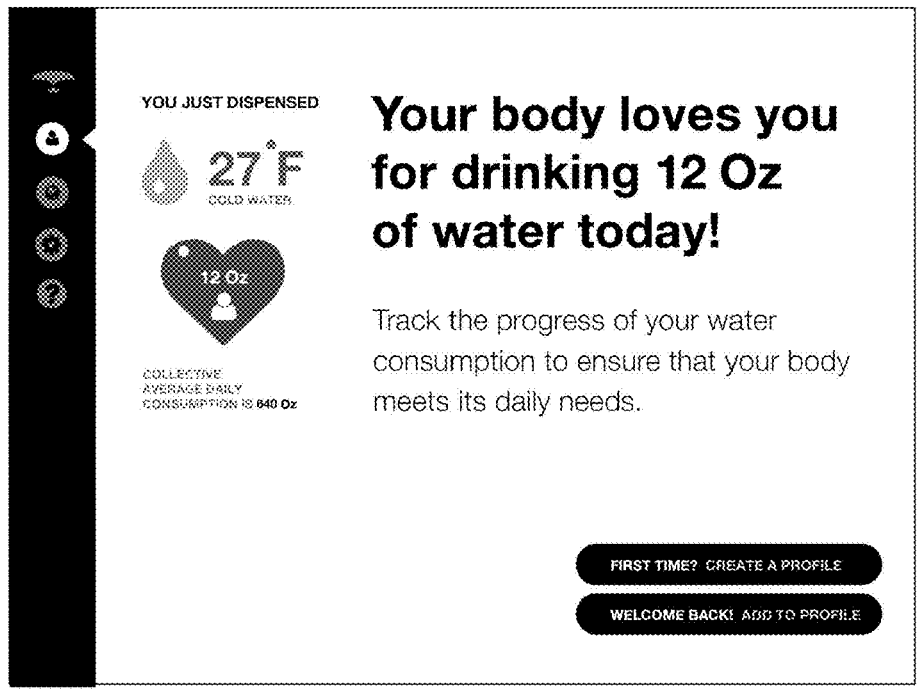
FIG. 21 is a wireframe view of an embodiment of a My Hydration Prompt screen, which includes the volume of water just dispensed, average consumption for all user of the generator, and open screen space in the lower left for co-branding opportunities.
Figure 22:
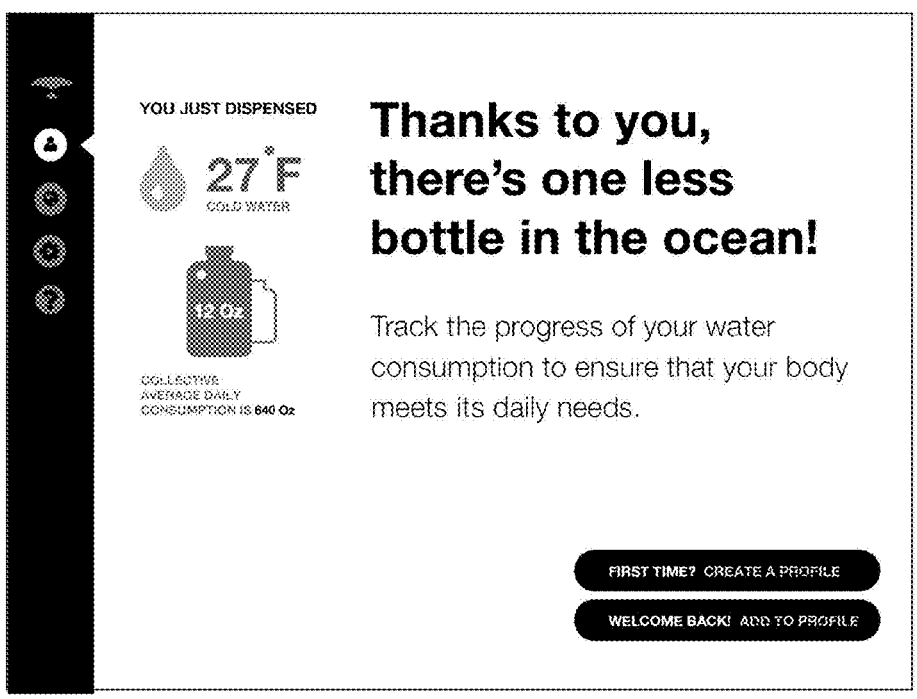
FIG. 22 is a wireframe view of a further embodiment of a My Hydration Prompt screen.
Figure 23:
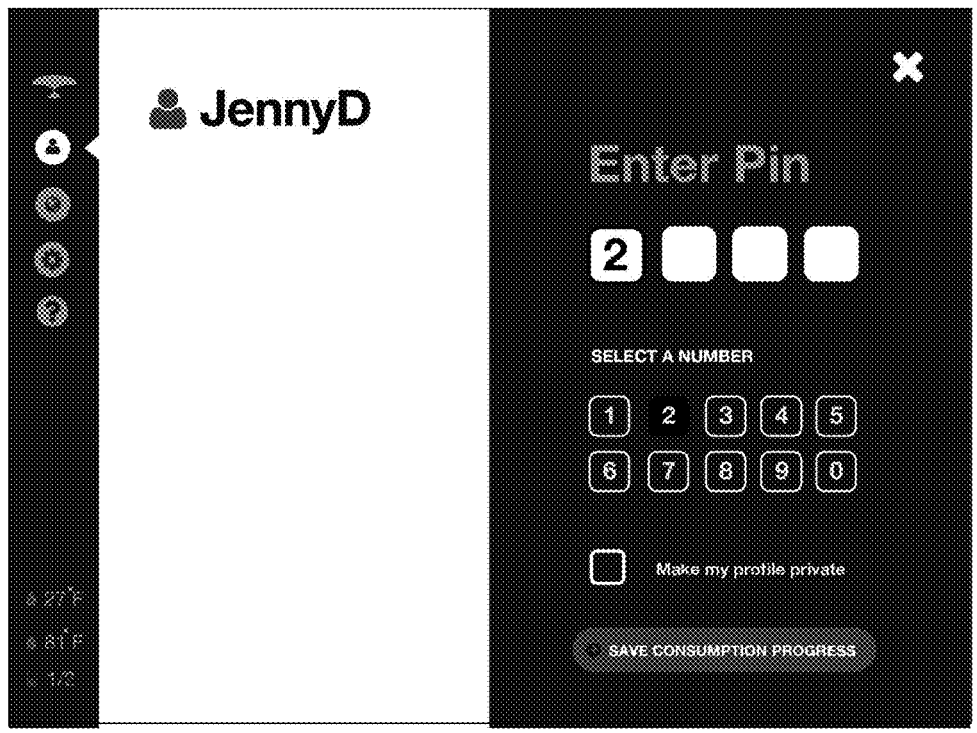
FIG. 23 is a wireframe view of an embodiment of a User Hydration Profile in Login State screen.
Figure 24:
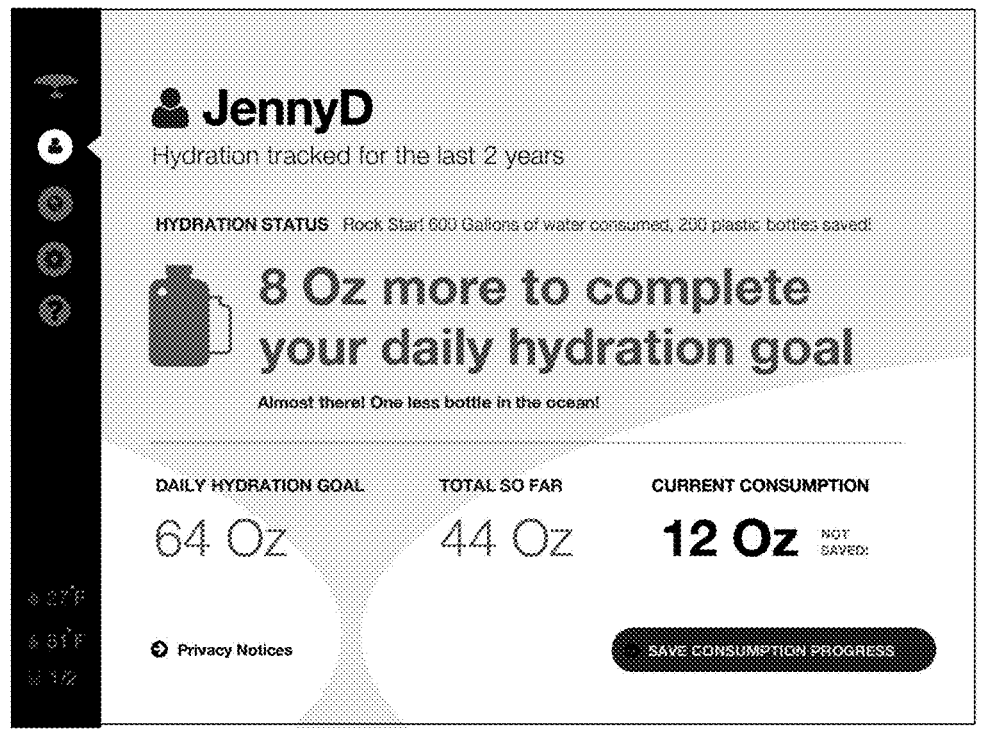
FIG. 24 is a wireframe view of an embodiment of a User's Hydration Profile screen, which includes water-consumption related motivational messages, personal water tracking information and the option to add the currently-generated consumption data to the user's profile for inclusion in their continued water tracking.
Figure 25:
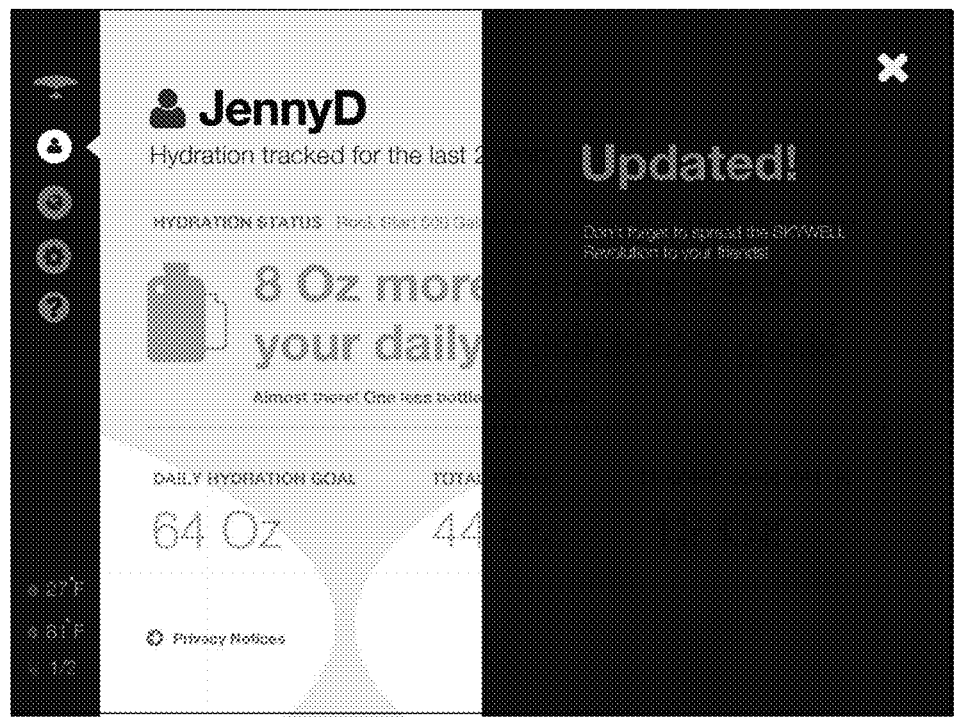
FIG. 25 is a wireframe view of an embodiment of a User's Hydration Profile in Saved State screen.
Figure 26:
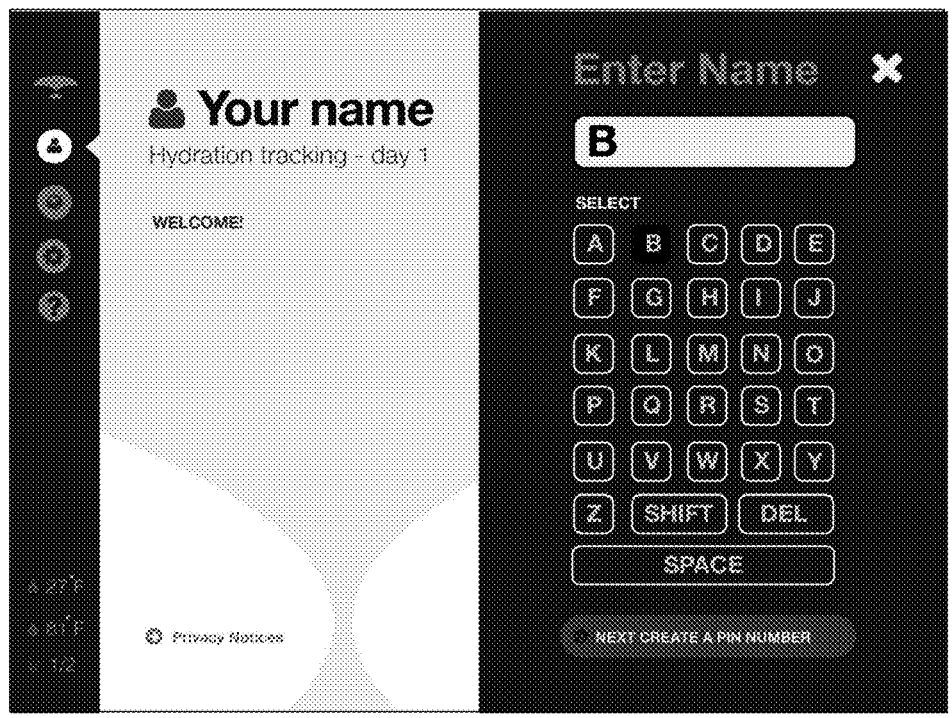
FIG. 26 is a wireframe view of an embodiment of a Create User Hydration Profile—Name Entry State screen.
Figure 27:
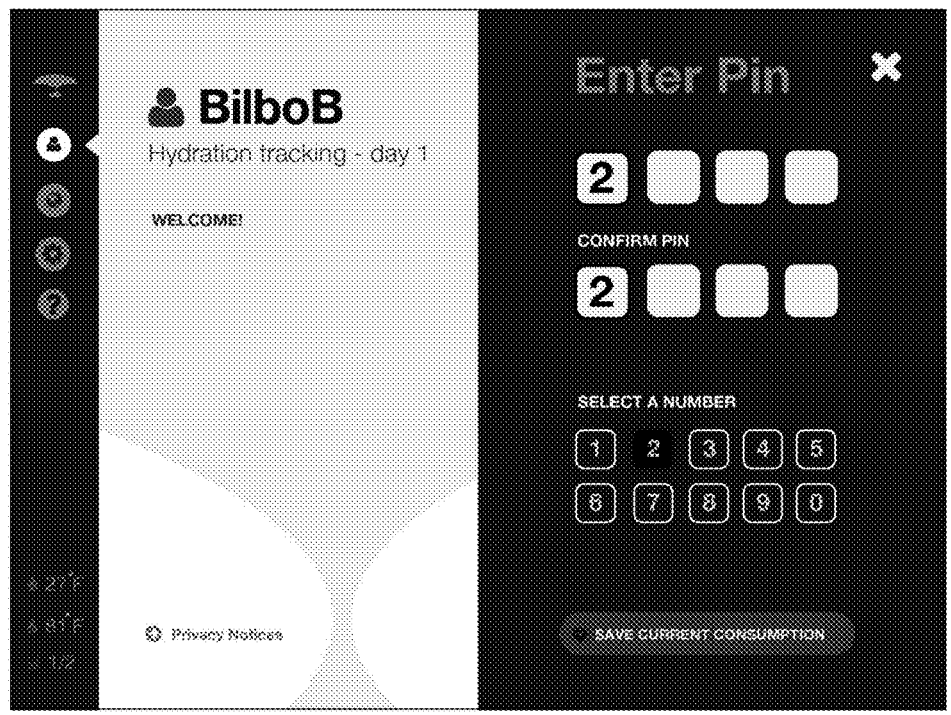
FIG. 27 is a wireframe view of an embodiment of a Create User Hydration Profile—PIN Entry State screen.
Figure 28:
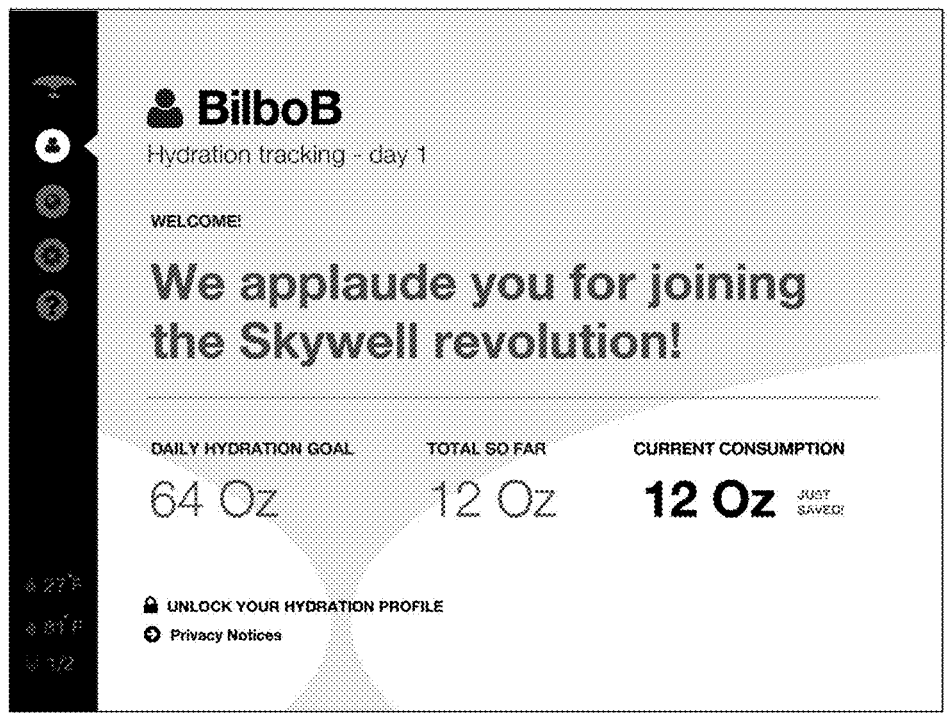
FIG. 28 is a wireframe view of an embodiment of a Private Hydration Profile screen, which presents user water-consumption goal and tracking information hidden from all other users.
Figure 29:
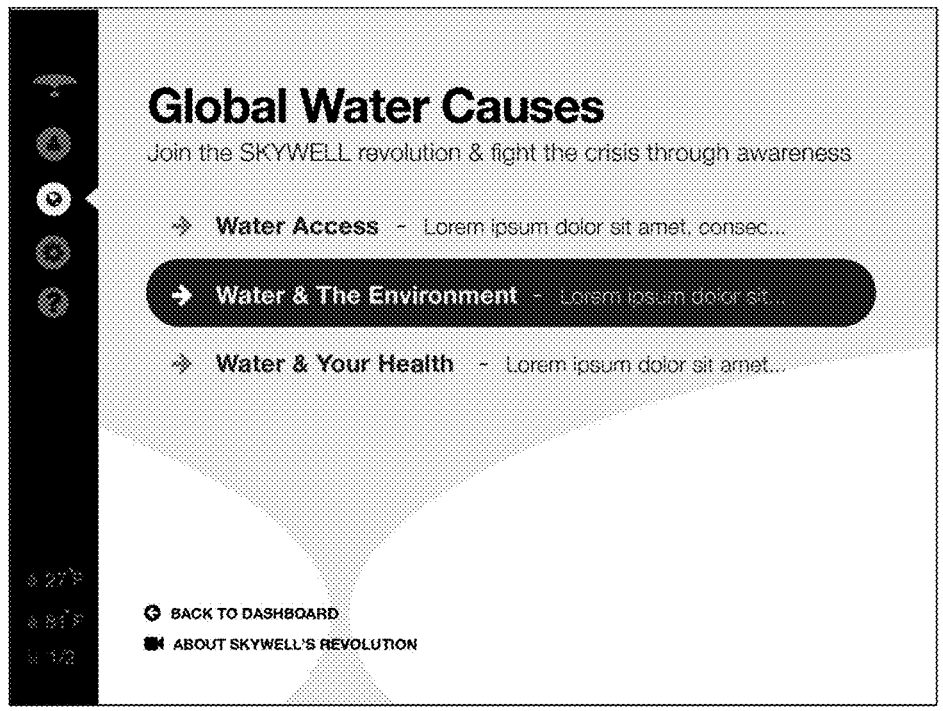
FIG. 29 is a wireframe view of an embodiment of a Global Water Causes screen.
Figure 30:
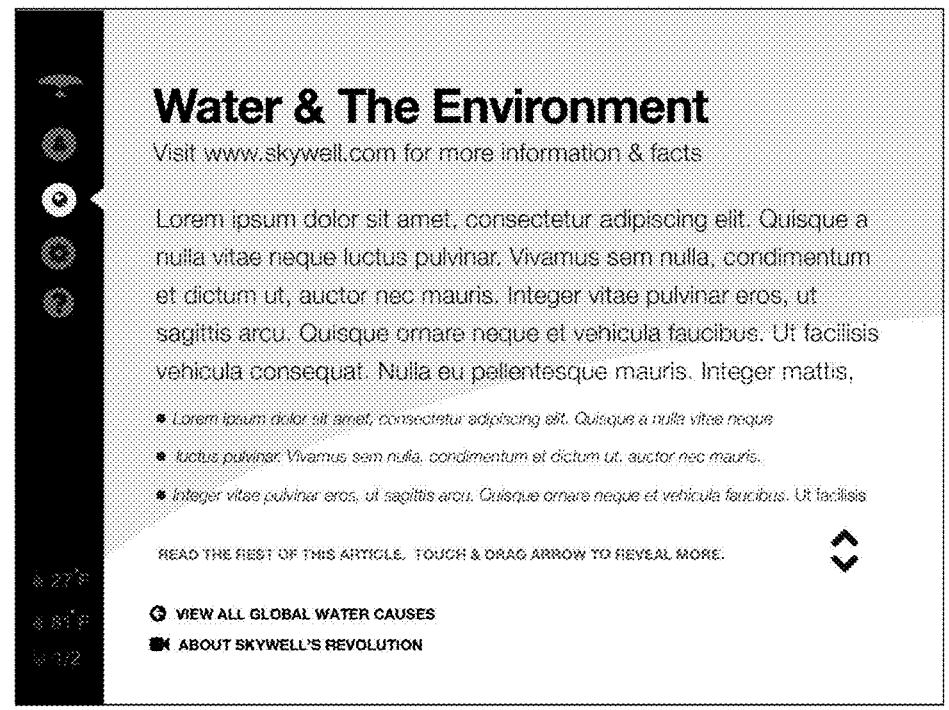
FIG. 30 is a wireframe view of an embodiment of a Global Water Cause screen.
Figure 31:
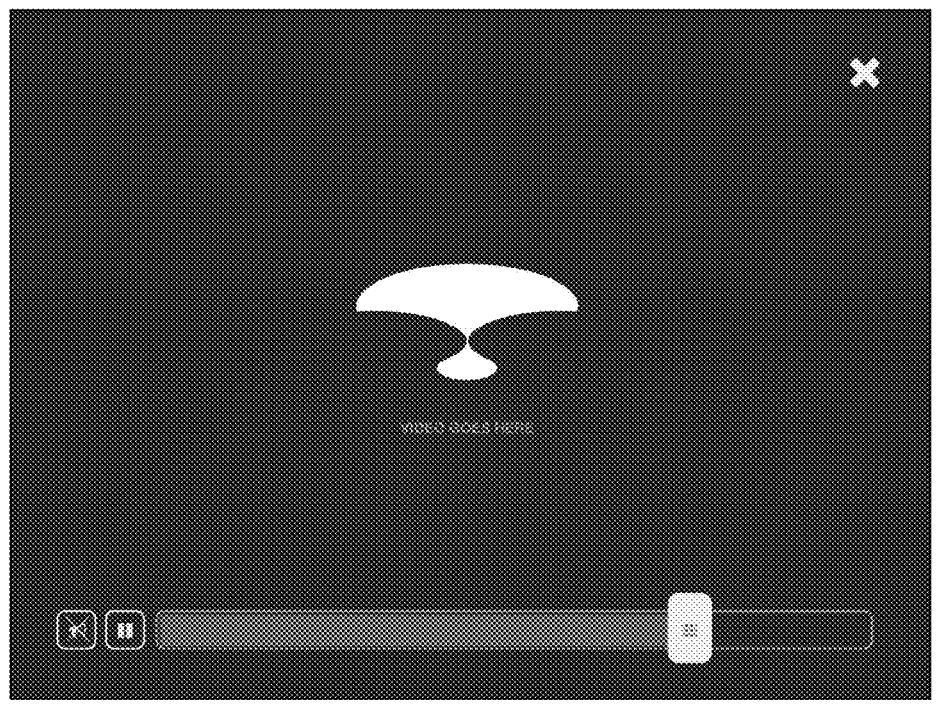
FIG. 31 is a wireframe view of an embodiment of a Video Viewing Overlay screen, wherein water-related motivational or educational video content may be presented, or advertisement and promotional messaging related to a partnering brand.
Figure 32:
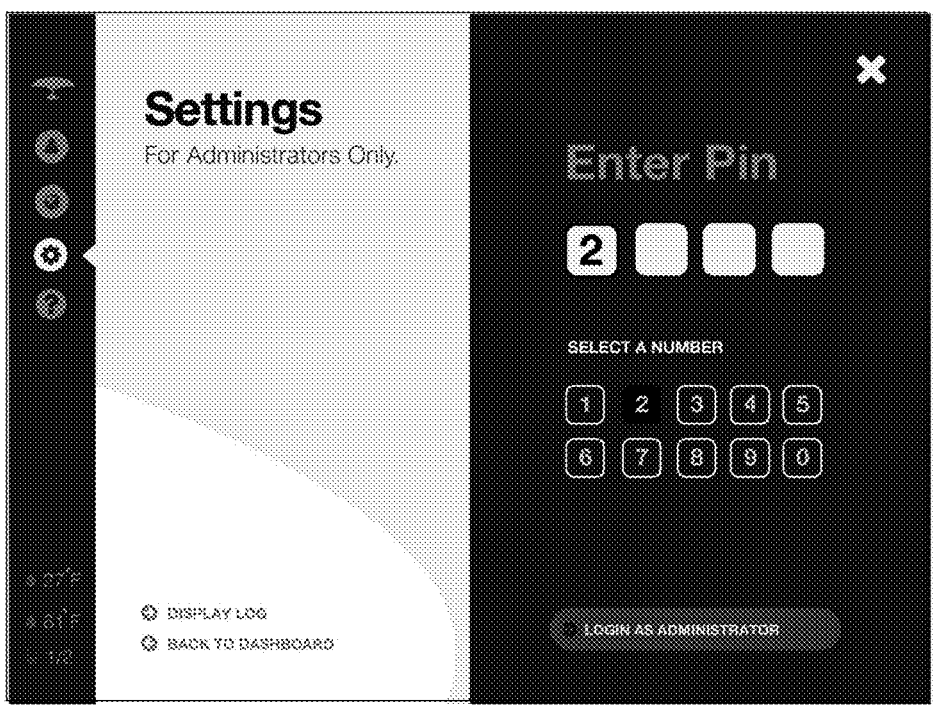
FIG. 32 is a wireframe view of an embodiment of a Settings Login screen, whereby an administrator may access the controllable features of the generator and software app running on the computer element.
Figure 33:
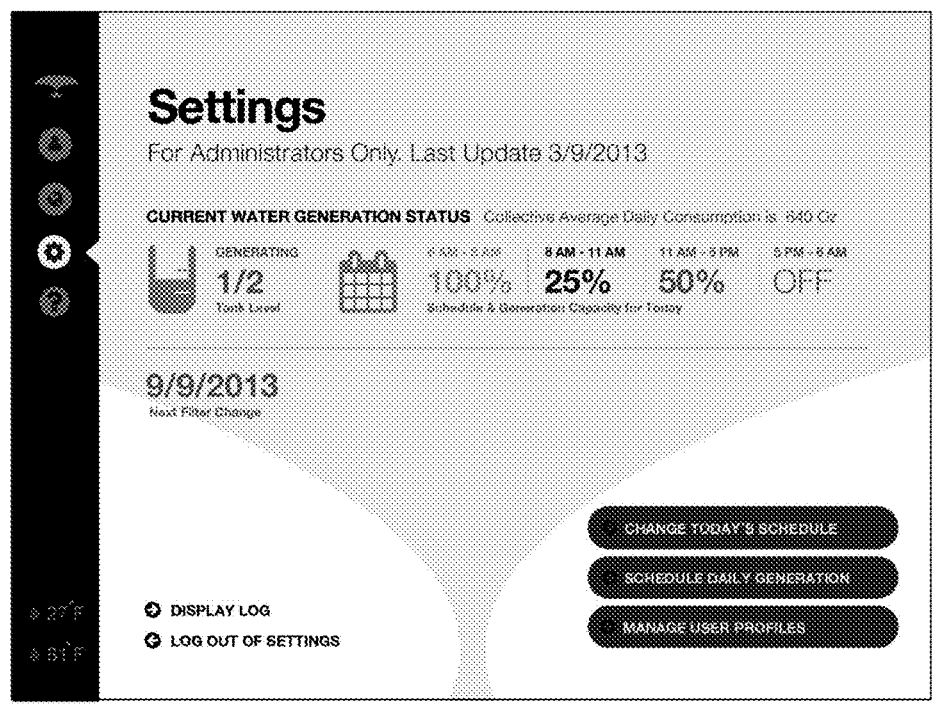
FIG. 33 is a wireframe view of an embodiment of a Settings Displaying Admin Dashboard screen, wherein the administrator is shown settings related to water generation, as well as additional machine service and water level status information.
Figure 34:
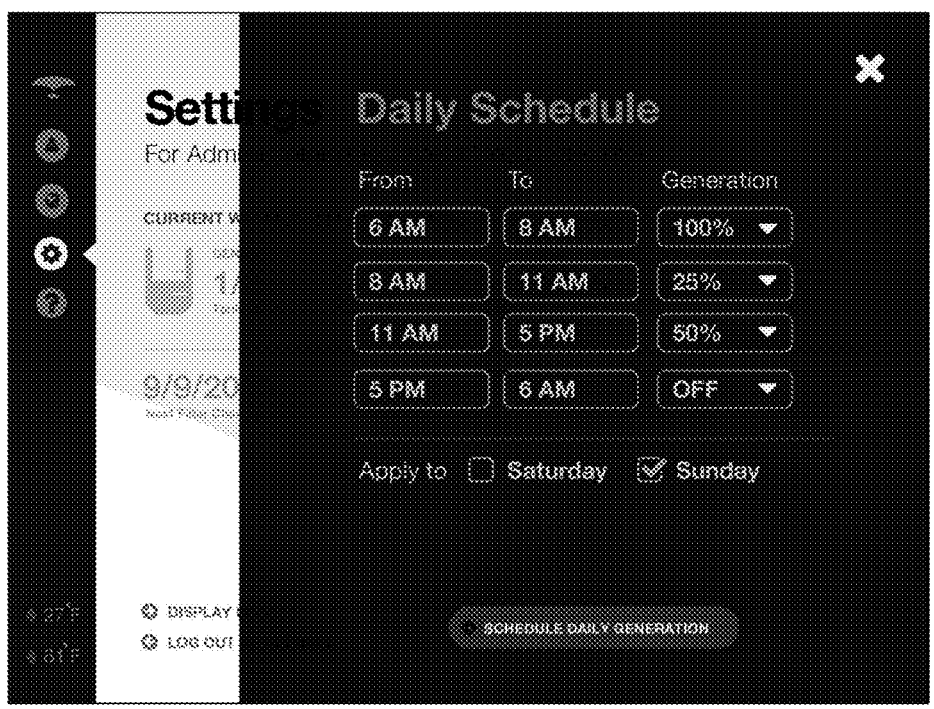
FIG. 34 is a wireframe view of an embodiment of a Settings for Scheduling Water Generation Daily screen, whereby an administrator may schedule water generation directly at the generator with the entered parameters being applied daily unless overridden.
Figure 35:
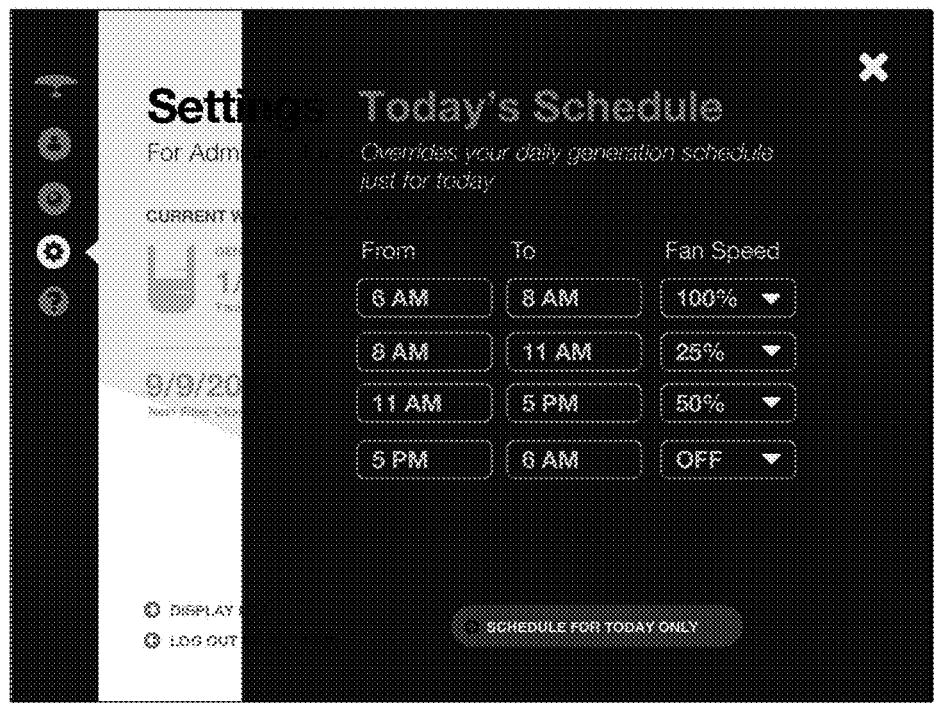
FIG. 35 is a wireframe view of an embodiment of a Settings for Overriding Water Generation for Current Day screen.
Figure 36:
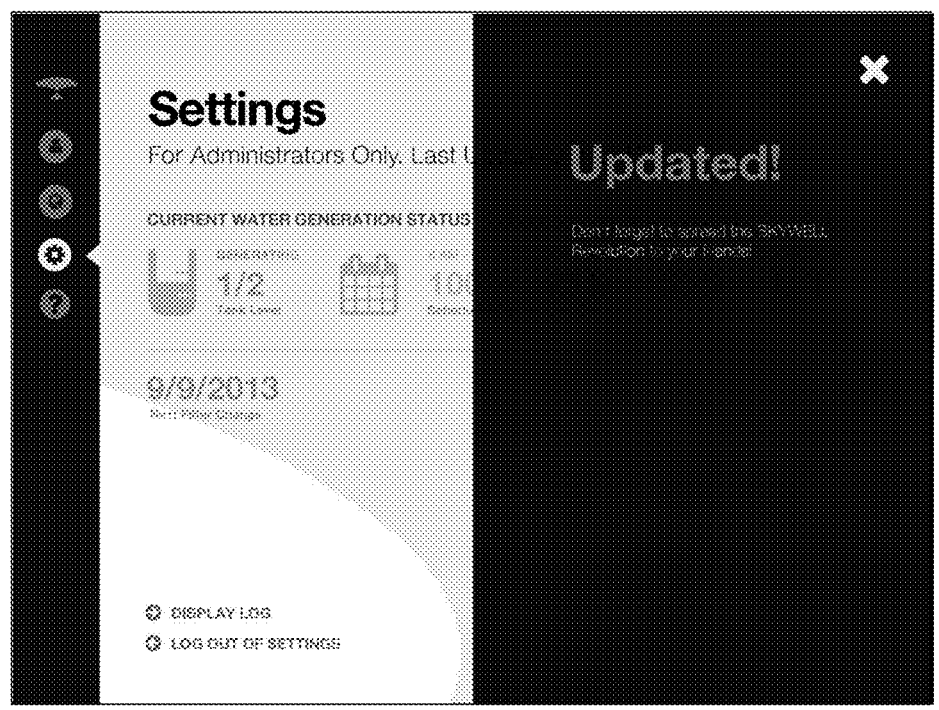
FIG. 36 is a wireframe view of an embodiment of a Settings for Scheduling Water Generation Confirmation screen.
Figure 37:
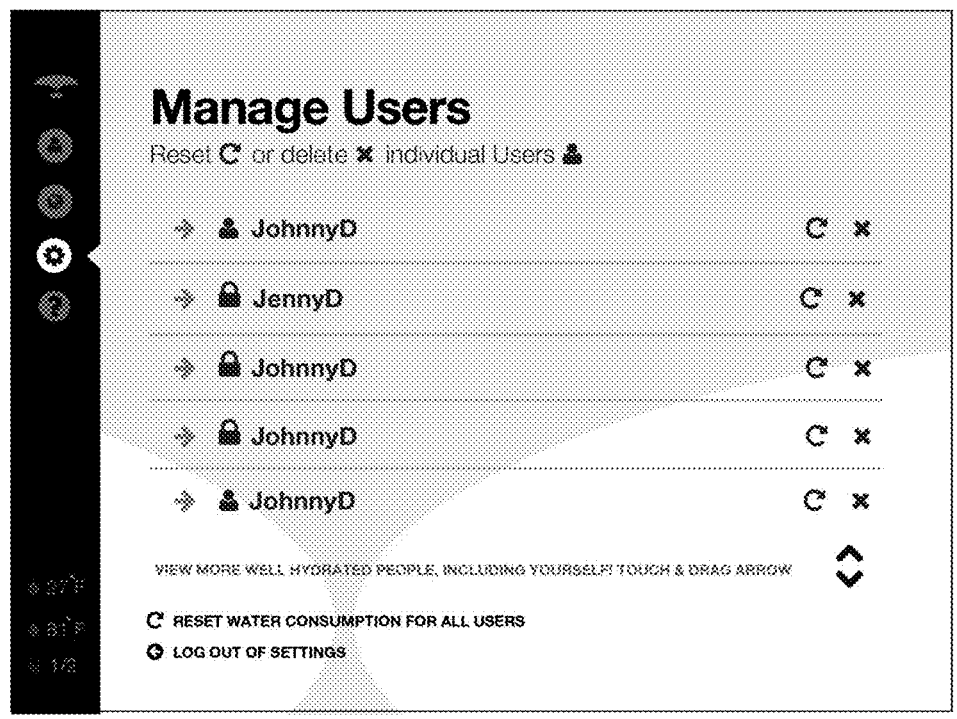
FIG. 37 is a wireframe view of an embodiment of a Settings for Managing Users screen.
Figure 38:
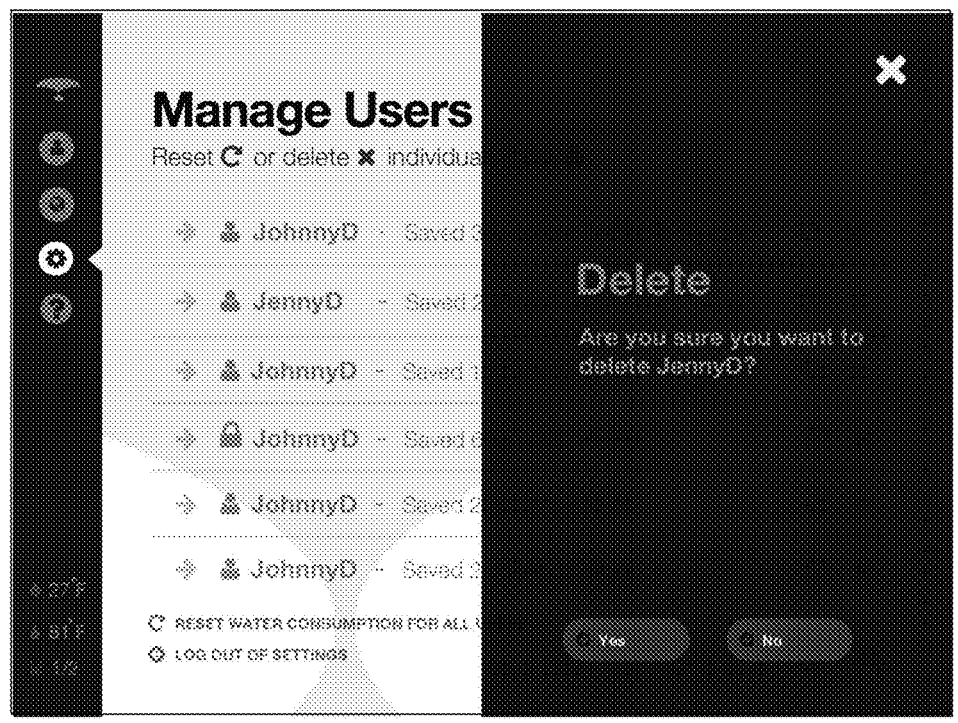
FIG. 38 is a wireframe view of an embodiment of a Settings for Confirming Action State screen.
Figure 39:
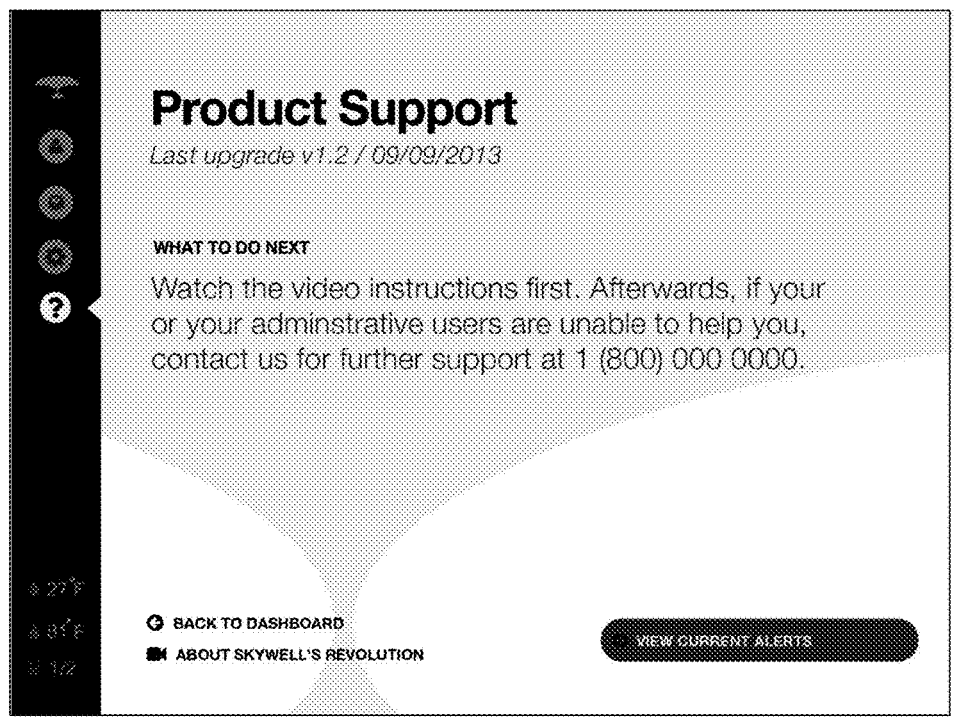
FIG. 39 is a wireframe view of an embodiment of a Product Support screen.
Figure 40:
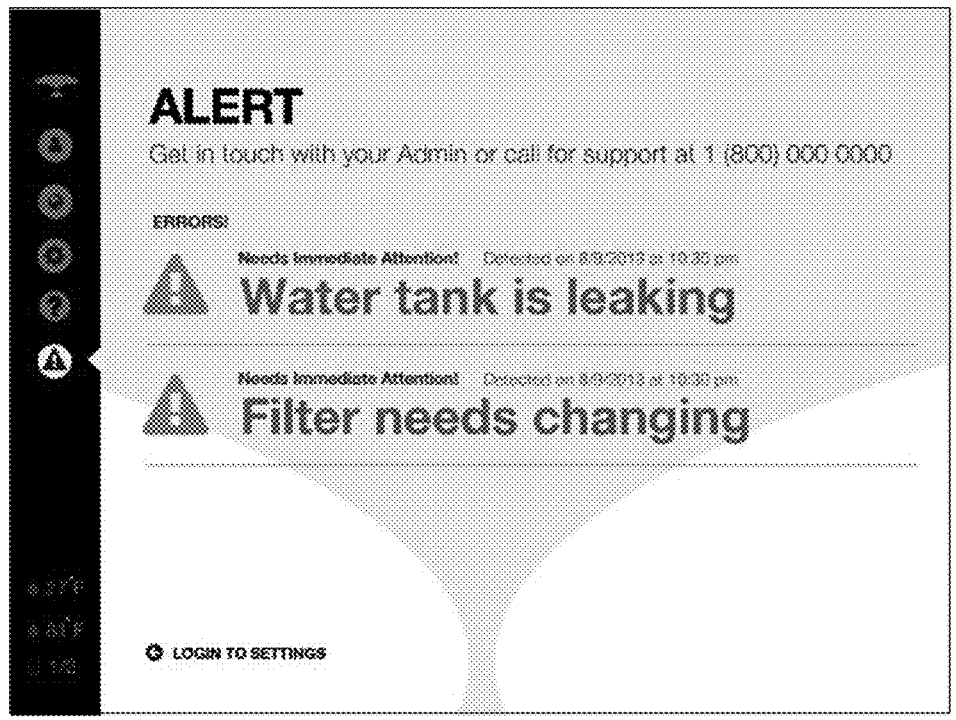
FIG. 40 is a wireframe view of an embodiment of an Alert screen.

In particular embodiments, the conveyed user aggregate volumes 154 may be accessible by mobile computing devices (e.g., cell phones, computer tablets, and the like) of respective registered users. With reference to FIG. 18 for example, in such embodiments the mobile accessibility (e.g., by mobile web browser or software app) may be by way of an intermediate server element. A server element may comprise one or more servers collocated or geographically dispersed from one another.

In certain embodiments, at least one of the user dispensing periods 152 is the portion of the current calendar day which has elapsed as of the latest dispensing by the respective registered user or users. In embodiments of the portable atmospheric water generator 100, the computer element 150 may include a machine counter which is configured to be reinitialized. In such embodiments, at least one of the user dispensing periods may be equivalent to the time which has elapsed since latest reinitialization of the generator 100. Moreover, at least one of the user aggregate volumes may correspond to the dispensing by all users of the portable atmospheric water generator.

Particular embodiments may comprise a flow measurement element for use in determining the actuated volumes of water. The flow measurement element (not shown) may be comprised of one or more flow sensors or flow meters respectively disposed, for example, in fluid communication between the one or more tap elements 144 and one or more corresponding potable water tanks (for example, cold tank 126 and hot tank 128).

Figure 17:
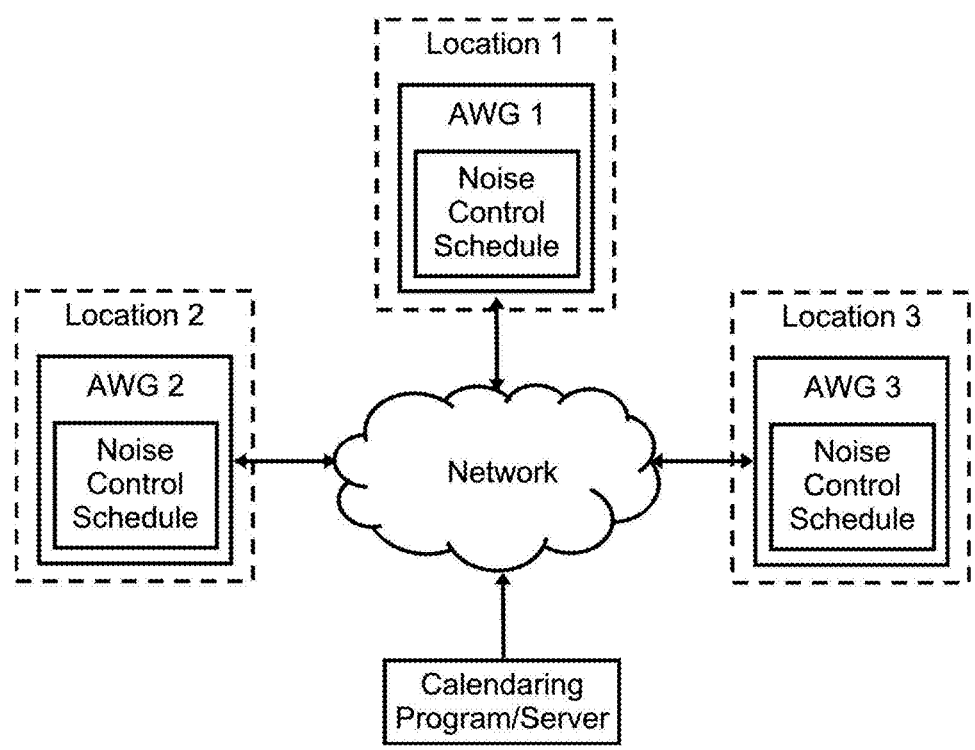
FIG. 17 is a schematic view of the system architecture in accordance with certain embodiment of the present invention, in which a multiplicity of AWGs are in network communication with a calendaring program operating from another node in the network.

Referring to FIG. 17 for illustration, in certain preferred embodiments of a generator 100, the computer element 150 may be configured to be placed in network communication with computer elements 150 of one or more additional said generators 100 located at other locations. Moreover, each of the computer elements 150 may be being configured to receive respective potable water availability data from each of the other generators 100 in the network, and indicate potable water availability and location information (for example, which room of a multi-room facility) corresponding to each of the other generators.

In particular preferred embodiments of a generator 100, the registering of one or more registered users enables the registered users to create respective user hydration profiles with associated user names, each user hydration profile including respective user hydration data. The user hydration data may be accessible by the respective registered user by logging into their hydration profile using a unique authentication ID. Moreover, the user hydration profile preferably tracks respective user aggregate volumes 154 conveyed in one or more forms, such as one or more standard units of volume measurement (for example, fl. oz., mL, etc.), a degree of progress toward a pre-set goal of the respective registered user, and/or a number of hypothetical plastic containers (for example, 20 mL. plastic water bottles) of pre-determined volumetric capacity which are collectively volumetrically equivalent to a respective user aggregate volume 154.

In embodiments, the authentication ID may be readable by the computer element 150 by way of the respective user's entry of a passcode. In addition or in the alternative, the authentication ID may readable by the computer element 150 by way of biometric sensing (for example, a fingerprint, iris recognition, etc.). Further in addition or in the alternative, the authentication ID may readable by the computer element 150 by way of radio frequency identification (RFID) tag, near field communication (NFC) tag or the like. In such embodiments, the RFID or NFC tag may be embedded or contained in a drinking vessel (for example, a cup, mug, thermos or bottle) of the respective user. In such case, the user's ID may be authenticated simply by using the tag-embedded vessel to receive dispensed water from the generator.

Embodiments of a generator 100 may typically include one or more dynamic components (for example, components with parts that move during operation). Each of the one or more dynamic components may have a respective active state which results in a respective acoustic signature (e.g., noise) audible to humans. In such embodiments, the computer element may be programmable with a noise control schedule. The noise control schedule may be configured to include times when one or more of the dynamic components are automatically maintained in a respective reduced activity state or inactive state. The reduced activity state may cause the respective component to generate less noise than it would in its active state. Similarly, the inactive state would typically result in the respective component making no noise whatsoever. Examples of such dynamic components may include a fan element 180, a compressor element 114 and pump elements 122 and 182.

The noise control schedule may be locally user-modifiable by way of, for example, a touch screen interface 102 of the generator 100. For example, a user may place the generator 100 into an instant silent mode by selecting a screen icon or pushing a button. Additionally or in the alternative, with reference to FIG. 17, the computer element 150 may be is configured to be placed in network communication with a calendaring program operating from another node in the network. The noise control schedule may be modifiable by way of the calendaring program. In certain applications, the network may be a LAN of an office environment, and, for example, when a meeting scheduled in the calendaring program to take place in a room in which the generator 100 is located, one or more of the dynamic components would be automatically placed in their respective reduced activity state or inactive state for the duration of the scheduled meeting.

In particular embodiments, the computer element 150 may be configured to be placed in network communication with an automated home appliance control scheduler. In such embodiments, the noise control schedule may be modifiable by way of the home appliance control scheduler.

In certain embodiments of a generator 100, the computer element 150 may be programmable with an energy control schedule. The energy control schedule may be configured to include times when one or more electrical energy consuming components of the generator 100 are automatically maintained in a respective reduced power state or off state. In such embodiments, the computer element 150 may be configured to be placed in network communication with an electric utility company for receiving therefrom periodic or real-time power grid demand data indicating high-demand times. The computer element 150 may then use this information to modify the energy control schedule to reduce the amount of time one or more of the electrical energy consuming components are in their active state during the indicated high-demand times. The energy control schedule may also be user-modifiable by way of a touch screen interface 102 of the generator 100.

Embodiments of a generator 100 may comprise a collection reservoir 118 configured to receive liquid water from the water production element and temporarily store a quantity thereof (for example, before it is pumped through filters 130 and bacteriostatic elements to cold and hot potable water tanks). A reservoir UV lamp 120 may extend through the collection reservoir 118 and being axially removable therefrom. For example, the reservoir 118 may be slidingly pulled outward of the cabinet of the generator 100, and the UV lamp 120 conveniently removed and replaced via axial removal from the reservoir 118 in a direction laterally thereof. The reservoir UV lamp 120 may preferably be substantially laterally centered within the reservoir, so as to help maximize the exposure of water present within the reservoir to UV light.

Figure 10:
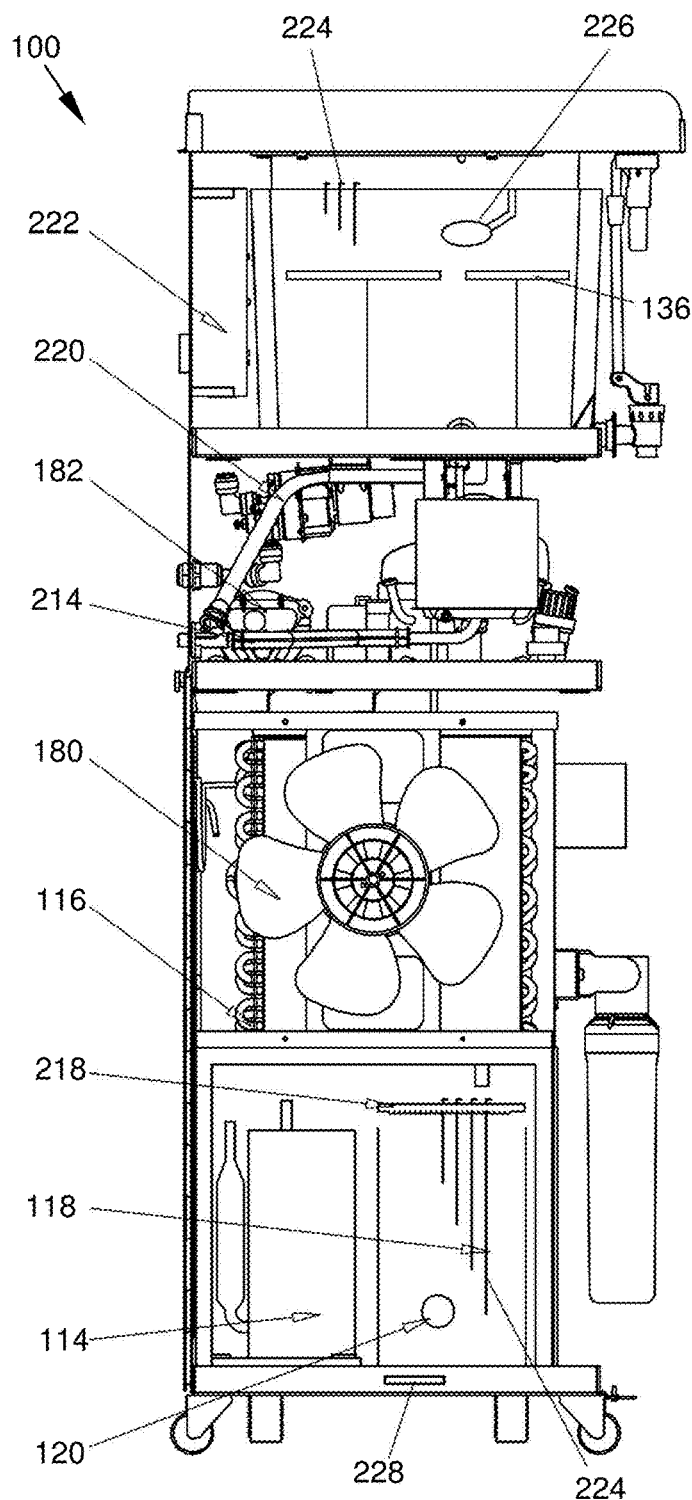
FIG. 10 is a diagrammatic view illustrating inner components of a further alternative embodiment in accordance with the aspects of present invention.

With reference to FIG. 10 for illustration, a cold water tank 126 may have associated therewith a floater 226 and electronic water level control 224. The reservoir 118 may have associated therewith an electronic water level controller 224 and a flat water filter 218. A leak sensor 228 may be provided toward the bottom of the generator 100 to provide an alert if and when a water leak has originated from any of the components in the generator 100. The cold and hot tanks may be in fluid communication with one another by way of a connecting tube 220. The connecting tube may connect with a hot water tank inlet 214. An electrical control enclosure 222 may be provided.

In embodiments of the generator 100, the collection reservoir 118 is typically configured to receive liquid water from the water production element and temporarily store a quantity thereof. Referring to FIG. 1 for illustration, an ozone generator 188 may be configured to generate ozone gas 196 routable to the collection reservoir 118 by way of an ozone conduit 190. In such embodiments, the presence of the stored quantity may define a waterline 192 at the upper surface of the upper surface of the stored water, and the collection reservoir 118 may include an ozone inlet 194 for receiving the ozone gas 196 from the ozone generator 188 and emitting it within the collection reservoir 118 at a location above the waterline 192. In embodiments in which a cold water tank 126 is in fluid communication with the collection reservoir 118, the ozone gas 196 may also be routable to an upper portion 127 of the cold water tank 126 by way of the ozone conduit 190. A pressure equalization valve 198 (for example, a throttle valve) may be provided for proportioning the ozone gas 196 routed to the collection reservoir 118 and the cold water tank 126. Alternatively or in addition, a waterline limit level 200 may be predefined within the collection reservoir 118, and the ozone inlet 194 may be configured to emit the ozone gas 196 within the collection reservoir 118 at a location above the waterline limit level 200.

In particular embodiments of a generator 100 having a cold water 126, the cold tank 126 is configured to receive water from the collection reservoir 118. In such embodiments, at least one hot tank 128 may be configured to receive water from the cold tank 126, which is connected to a heating element configured to heat the water contained within the hot tank 128. A central processing unit may be provided which is programmable by a user through a control panel. The central processing unit may be configured to communicate with the heating element and cause power to be delivered to the heating element according to a defined protocol, wherein the protocol specifies: (i) a frequency and magnitude of pulsed energy to be delivered to the heating element from a power source; and (ii) a set temperature, or a set range of temperatures, for water contained within the hot tank and cold tank.

The aforementioned protocol may further specify a rest period, wherein the rest period is a period of time during which the set temperature, or the set range of temperatures, for water contained within the hot tank is reduced relative to a temperature that is associated with a normal operating period of time. The protocol may further specify whether: (a) the set temperature, or the set range of temperatures, for water contained within the hot tank takes precedence over water contained in the cold tank 126; or (b) the set temperature, or the set range of temperatures, for water contained within the cold tank 126 takes precedence over water contained in the hot tank. The protocol may further specify a total power usage limitation for the portable atmospheric water generator 100.

In particular such embodiments, the total power usage limitation may comprise (a) a specific or maximum amount of energy that may be delivered with each pulse of energy; (b) an aggregated maximum amount of energy that may be delivered over a defined period of time; or (c) a combination of (a) and (b).

Figures 6, 7:
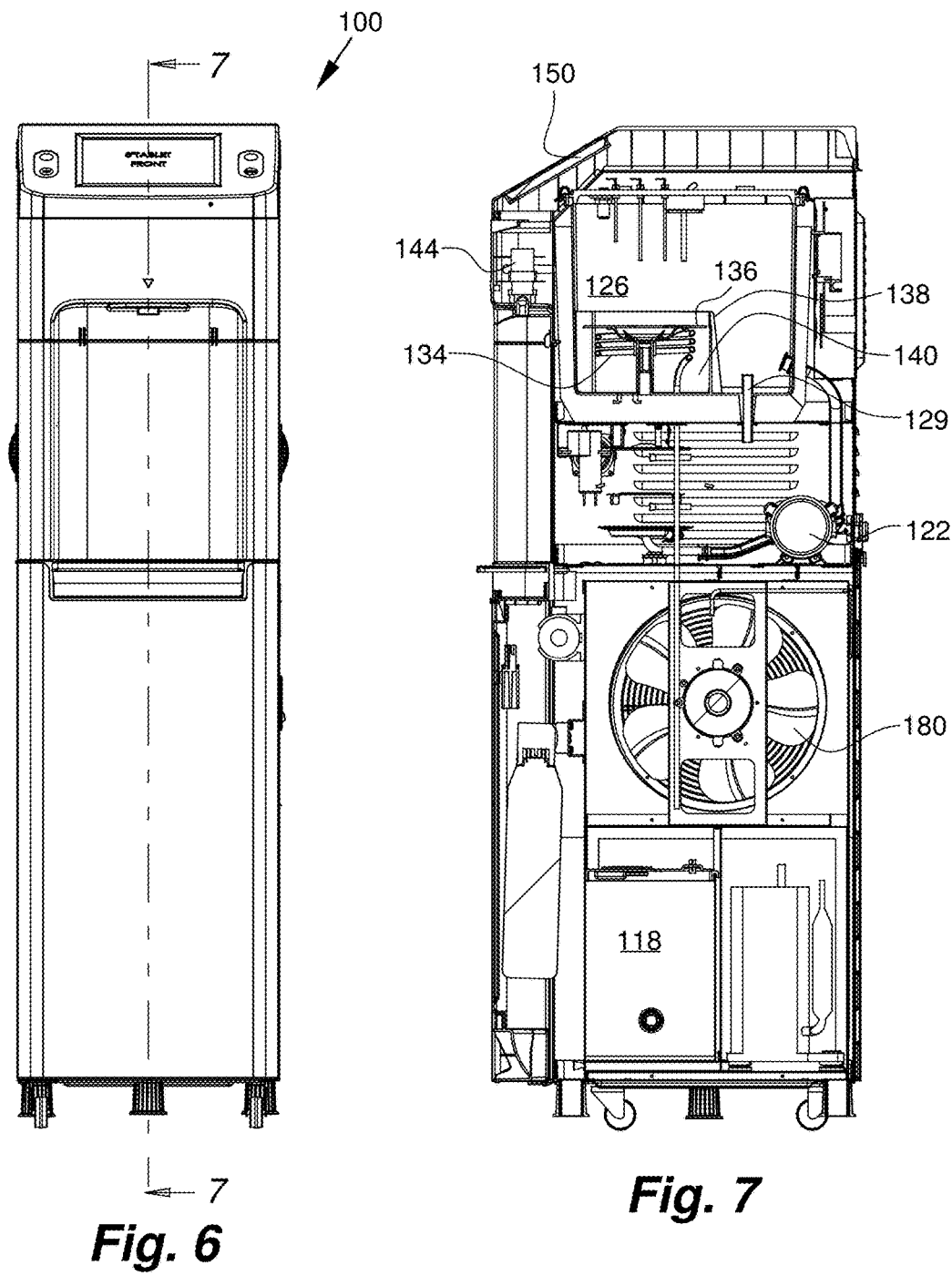
FIG. 6 is a diagrammatic front view of the example system of FIG. 2.
FIG. 7 is a diagrammatic cross-sectional view taken at line 7-7 of FIG. 6.
Figures 8, 9:
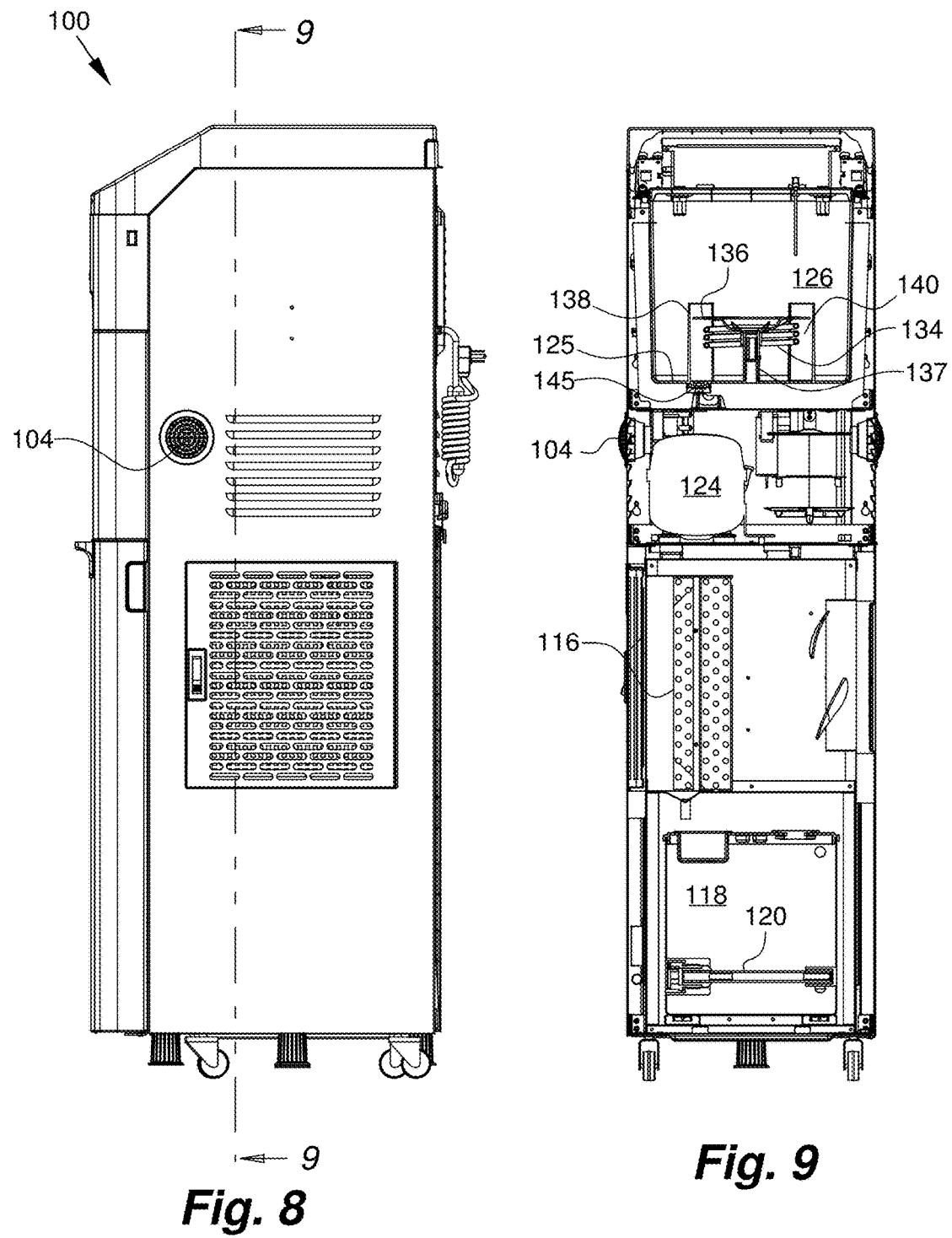
FIG. 8 is a diagrammatic side view of the example system of FIG. 2.
FIG. 9 is a diagrammatic cross-sectional view taken at line 9-9 of FIG. 8.

With reference to FIGS. 7 and 9, certain embodiments of a generator 100 may comprise a cold tank refrigeration compressor 124 and a cold tank 126 configured to receive water from the collection reservoir 118. The cold tank 126 may have disposed therein (a) a vertically extending shroud element 138 defining a lateral perimeter of a shrouded volume 140, (b) a laterally (e.g. radially) extending baffle element 136 defining an upper perimeter of the shrouded volume 140, and (c) a refrigerant evaporator coil 134 in fluid communication with the refrigeration compressor 124 and disposed within the shrouded volume 140. The baffle element may be supported within the cold tank by a pedestal element 137. The shroud element 138 may extend vertically from a bottom wall 125 of the cold tank 126. A hot tank 128 may be in fluid receiving communication with the cold tank 126 by way of, for example, a first cold tank exit port 129 disposed outside of the shrouded volume 140. A cold water tap 144 may be in fluid receiving communication with the cold tank 126 by way of a second cold tank exit port 145 disposed within the shrouded volume 140. This shrouded evaporator coil configuration within the cold tank allows colder water to be produced and dispensed more efficiently, due in part to the fact that the entire water volume within the cold tank need not be maintained at the coldest dispensing water temperature. Rather, a more limited volume of water within the cold tank is maintained at the coldest dispensing temperature Referring now to FIG. 18, an example embodiment of a system in accordance with the present invention may comprise one or more portable atmospheric water generators 100 (AWGs). The AWGs may each comprise a water production element, a flow measurement element and a computer element 150. The water production element is typically configured to transform water vapor from the ambient air to liquid water. The flow measurement element may be adapted for use in determining one or more volumes of potable water dispensed from the AWGs by users during one or more respective dispensing periods 152. The computer element 150 may be configured to obtain user profile data, dispense data and service data. The user profile data may pertain to one or more respective registered users. The dispense data may pertain to at least one or more of the volumes of potable water dispensed by respective registered users. The service data may pertain to the operation of one or more components of the respective generator 100. A server element may be network communication with the AWG computer elements and configured to receive therefrom one or more of the user profile data, dispense data and service data. This network communication may preferably be by way of Internet connection.

In certain embodiments of a system, the server element may include a database element for tracking the respective volumes of potable water dispensed by respective registered users as input to a statistical or game-based competition between competing registered users. Moreover, the server element may run an application programming interface (API) accessible by mobile computing devices of respective users. The API may make available to a social network account of one or more of the registered users: (a) the dispense data pertaining to the respective registered user; and (b) a respective number of hypothetical plastic containers of pre-determined volumetric capacity which are collectively volumetrically equivalent to each of the one or more volumes of potable water dispensed by the respective registered user.

In embodiments, the server element may be further configured to send to the AWG computer elements 150 for display on the respective display screens 102 at least one or more of: (i) aggregated user data including a total of all of the volumes of potable water dispensed by a respective registered user from all of the respective portable atmospheric water generators during a respective dispensing period; (ii) educational or motivational messages relating to water use; (iii) educational or motivational messages relating to water conservation; (iv) graphics, messages or promotions relating to a brand; and (v) service notifications. The server element may further be configured to send software application updates to the computer elements 150.

Embodiments of a method of generating potable water from ambient air may comprise the steps of (a) providing a water production element configured to transform water vapor from the ambient air to liquid water; (b) furnishing at least one tap element being in water receiving communication with the water production element and being user-actuatable between an open state and a closed state, the at least one tap element being configured to allow water to be dispensed therefrom when in its open state and to prevent water from being dispensed therefrom when in its closed state, and selecting a computer element. (i) Actuation periods 146 are respectively defined by each length of time the at least one tap element 144 is continuously in its open state. Actuated volumes of water 148 are respectively defined by the volume of water dispensed during each actuation period. The computer element may preferably be configured for: (i) registering one or more registered users of the generator; (ii) recording each actuated volume dispensed throughout respective user dispensing periods; (iii) summing the respective actuated volumes attributable to each registered user, thereby defining respective user aggregate volumes; and (iv) conveying respective user aggregate volumes to one or more of the registered users.

Embodiments in accordance with the present invention may comprise, in addition to other novel features, improvements in one or more of: (a) programmability and increased energy efficiency of the dehumidification process, (b) bacteriostatic UV light design, (c) self-cleaning ozone sanitation design, (d) increased energy efficiency in connection with the heating and cooling of the water and (e) user interface.

With regard to the dehumidification process, the water production subsystem of conventional portable AWGs typically operates at random times of the day, for example, whenever the respective machine senses it is low on stored water. Such conventional systems may thereby generate compressor noise at inopportune times of the day in the room where the AWG is stored (e.g., an occupied meeting space, a child's bedroom during sleep, etc.). To address this problem, certain embodiments of the present invention provide the ability for a user to program times when the water production subsystem of the AWG is allowed to operate. As a result, the user is able to control the resulting noise level based on their needs within the environment. Thus, an improved AWG system as disclosed herein may be more suitably utilized in quiet portions of a home or office setting, for example.

By way of example, a user may program an AWG machine so that it is free to produce water 100% of the time Monday through Friday from 6 pm through 8 am, or, in the alternative, any time except a particular day between 1 pm and 3 pm if a conference is scheduled to occur within the same room during that time (e.g., to ensure the machine produces no compressor noise during that meeting). In particular such embodiments, a computer-network-based scheduler (e.g., such as Microsoft Outlook® or the like) may be remotely interfaced with the AWG machine such that the machine is automatically programmed not to produce water during periods of time when meetings are scheduled in the same room. In such an embodiment, a scheduling secretary or clerk may merely schedule use of the conference room as they would normally do from, for example, their own computer, and that computer (or an intermediate server, for example) would communicate the corresponding water production "blackout time" to the AWG machine located within that conference room.

Referring now to ATTACHMENT A, certain preferred embodiments may include a touch-screen interface (e.g., like an IPad or similar tablet). Such an interface may provide functionality aimed at dramatically increasing and improving user engagement and more efficient system operation by including, for example, one or more of the following:

(a) Providing an ongoing tally or tote board indicating, for example, how many 16.9 oz. plastic bottles are being saved in the aggregate by the host office by consuming "Air Water" from machines in accordance with the present invention instead of water from plastic containers (e.g., 5 gallon jugs or single user size plastic bottles).

(b) Providing individualized counts whereby each office user can keep track of how much water they individually consume on a daily/weekly/monthly/yearly basis, as well as personal preferences for settings, by entering their personalized code (e.g., their initials) or swiping a card or sensor unique to their identity. Traditional methods for a user to identify himself have involved active input, such as selecting from a list of users. Comparatively, embodiments of the present invention may involve passive identification, such as through biometrics (including fingerprint or iris scanning), through a custom passive marker (e.g. a unique radio frequency identification/RFID or near field communication/NFC), or by coupling identification verification with an existing marker (e.g. using the user's cellular telephone or car key fob). Custom passive identification markers may exist in the form of keycards or embedded within water-containing vessels to allow for automatic identification, and would allow for immediate connection between the user and the embodiment without the need for an active input. This immediate passive connection may increase overall use of the air-water-generator, increase tracking of water consumption, decrease time required to dispense water, increase data security, and enhance overall user engagement with the device. Such a feature may encourage competitions among members of the household, business facility or office space where the AWG machine resides. For example, to determine which individual, team, department, or office consumes the most water from the machine over a given period of time. Such competition may spur improvements in the health of the participants and encouragement of environmentally responsible behavior by the participants (e.g., via saving of plastic bottles). The tablet or associated components forming a part of the improved AWG system may be adapted to wirelessly (or via LAN, for example) transmit respective data to the mobile devices (cell phone, tablet, etc.) or personal computers of a particular user.

(c) Displaying fun and educational water-related facts and messaging on the tablet screen. For example, the user may be taught how much water the average person consumes per day; how much water it takes to make a plastic bottle, etc. In alternative or in addition, local/regional/national/international news, sports, entertainment and finance may be displayed. Further in the alternative or in addition, the tablet may present emergency notifications such as national disasters, local traffic, etc.). To enhance the user experience with the tablet, embodiments of the AWG machine may be equipped with speakers 104 providing sound and audio.

(d) Displaying health and worker productivity items, and inspirational quotes.

(e) Playing socially and environmentally-responsible messaging and videos.

(f) Presenting corporate or household messaging, such as scheduling/announcements, mission statements, household grocery lists, etc.).

(g) Presenting diagnostic information relating to the performance of the AWG machine (e.g., component failures or filters/lamps requiring replacement). Relatedly, such diagnostic information may be transmitted to a main office or headquarters, which in some cases may be able to troubleshoot and solve the problem remotely. This approach may result in the saving of gas, energy and/or manpower. Moreover, in particular embodiments, wireless programming of the tablet may occur remotely from an operating headquarters which communicates with AWG machines operated by different customers in different locations.

Particular networkable embodiments of the improved AWG machine discussed herein may be configured to transmit data associated with the performance and volumes and patterns of water consumption associated with respective machines. One or more network servers may be provided to receive such data and facilitate or conduct the aggregation of such data in order to, for example, track machine usage, consumer behavior (e.g., how much water consumed, how often and at what times) and correlate the weather patterns local to each machine with water production and other machine performance parameters of the respective machines. Preferred embodiments of the AWG machine may be adapted to connect to the Internet by way of wifi connectivity. In embodiments, multiple AWG machines in a particular facility (e.g., an office) may be adapted to interconnect with one another, wirelessly or otherwise, to share data or facilitate efficient aggregation of the data from the AWG machines within that facility. The purchaser of the machine may be incentivized to plug the machine into the network (e.g., in communication with the one or more remote network servers) by being offered free or discounted troubleshooting and maintenance (e.g., replacement of filters, tank and conduit cleaning, and/or repair or replacement of machine components). Such networking may work to the advantage of the troubleshooting and service provider, in that such provider may be able to present audio, video or still-shot advertisements on the AWG machine tablet by way of the network connection, and be compensated accordingly by the respective advertisers. Such advertisements may be presented, for example, by way of streaming the respective ad from an advertisement server or database, through the network and to the tablet.

Figure 5:
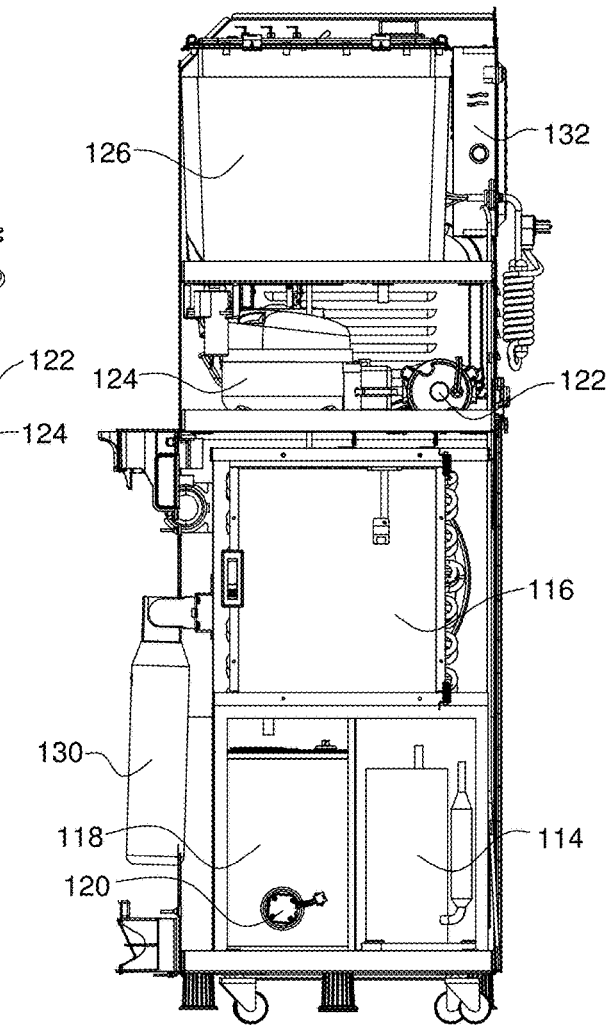
FIG. 5 is a side view of the system and configuration shown in FIG. 4.

With regard to the need to improve bacteriostatic UV light design and configuration, there have historically been difficulties in achieving complete exposure of UV light to large enough volume of water stored in an AWG machine. By way of example, some conventional AWG machines provide a UV tube through which water is pumped or otherwise flows. This generally results in limited direct exposure of bacteria to the emitted UV rays. In addressing this problem, embodiments of the present invention may provide one or more UV bulbs 120 removably disposed transversely across approximately a volumetric midplane or midpoint of the water collection or storage reservoir 118 (see, for example, FIGS. 5 and 9). Such a configuration helps ensure that a greater percentage of the stored water, and any bacteria therein, becomes more directly exposed to UV light for more extended periods of time.

Historically, portable AWG machines have largely lacked features which engage the attention and loyalty of users. For example, such conventional systems fail to provide interactions which are fun and educational, or which make the user feel more environmentally responsible through their use of the machine. Embodiments in accordance with the present invention may provide a user interface by way of, for example, a touch-screen tablet. Such user interface device may enable one or more of the following: (a) allow the user to create and monitor a unique "user hydration profile" which allows her to track (e.g., on demand) her daily/weekly/annual water consumption and positive environmental impact through plastic water bottle savings; (b) expose the user to daily fun/educational water, health, educational, environmental facts which are both locally and globally relevant; and (c) display the degree to which that user has had an ongoing positive environmental impact for herself and others in relation to, for example, the number of plastic bottles their use of the AWG machine has saved from otherwise ending up in oceans and landfills.

Certain recent solutions proposed to control bacteria growth within the AWGs have relied on the use of ozonation. By way of example, ozonators or the associated ozone emitters have been installed at or near the bottom of the water collection tank of the AWG. The conventional thinking was that, because ozonation has been used in large scale municipal water treatment plants to treat sewage for many years, it would be as effective when used in a dramatically smaller AWG applications as well. Unfortunately, this may not be the case. In the municipal water treatment plant application, the emitted ozone is more vigorously mixed into a much larger percentage of the water sought to be "treated" by way of, for example, the use of a massive venturi effect self-contained mixing pressurized system.

Contrastingly, emission of a stream of ozone bubbles from the bottom of the collection tank or cold water tank of a conventional AWG machine results in the ozone bubbles coming into direct contact with a relatively small percentage of the water contained in the respective tank. As a result, large, underutilized concentrations of ozone must then be vented to the surrounding atmosphere Rather, a significant amount of the ozone produced in such conventional AWG machines ends up collecting above the waterline of the respective tank, and requires venting to the surrounding ambient atmosphere. In order to protect the inhabitants of the surrounding environment from dangerous ozone exposure, filters are often provided to break down the ozone gas prior to its release from the conventional AWG machine back into the surrounding environment.

One aspect of the present invention allows bacteria growth to be contained in a manner which is more practical and effective than the solutions previously proposed in the art. The majority of bacteria growth does not actually begin within the water in the collection tank, but rather on the walls of the collection tank. By way of example, water levels rising and falling within the tank leave the tank walls moist and damp—ideal conditions for bacteria growth. The present invention implements an ozone distribution system that relies on the emission of much smaller volume of ozone gas. Referring to FIG. 1 for example, in preferred embodiments of the present invention, the ozone gas is not required to be emitted within the water contain within the tank, but rather at a location above the waterline in order to more directly manage or eliminate bacteria growth on the tank walls. As a result, the bacteria growth is stopped at the area within the respective water tank that experiences the most bacteria growth in an AWG. A pressure equalization valve (marked "throttle valve in FIG. 1) may be provide to ensure that the collection tank receives a proportionate amount of the emitted ozone. An axially-removable and replaceable UV lamp 120 may be provided in the collection tank 118 to prevent bacteria growth in the water itself. In embodiments, a water way UV lamp 106 may also be provided.

Moreover, because embodiments in accordance with the present invention produce significantly less ozone than the conventional "in the water" solutions, the production of excess ozone gas is avoided. Therefore, there is no longer a need for ozone filtration mechanisms commonly seen in the recent conventional art.

Referring, for example, to FIGS. 7 and 9, certain embodiments in accordance with the present invention feature improvements in cold tank 126 designs which allow colder water to be produced faster and more efficiently than convention cold tank solutions in the AWG field. A relatively small (e.g., approximately 80-Watt) refrigeration compressor unit 124 (fully independent of the primary dehumidification compressor) may be provided in communication with a coil 134 of refrigerant piping to create a physical ring of ice on the bottom portion of the cold tank underneath a baffle 136.

Particular embodiments in accordance with the present invention feature improvements in hot tank technology which produce hotter water with less energy consumption than conventional hot tank solutions in the AWG field. In most conventional water dispensing machines, a significant amount of energy is used to heat water once the temperature of water in the hot tank drops below a certain level. Once the temperature of that water rises to the upper set point, the energy is no longer applied until the water temperature drops to a lower set point several minutes or hours later. Once the water temperature dropped (as it necessarily does over time) the conventional generator would have to crank up its output to raise the water temperature to the desired level. This results in an inconsistent temperature experience for the coffee or tea consumer. In contrast, a preferred embodiment of the present invention may implement a small (e.g., approximately 75 watt) generator that emits a very low but very consistent energy pulse which keeps the water temperature consistently high.

Figure 2:
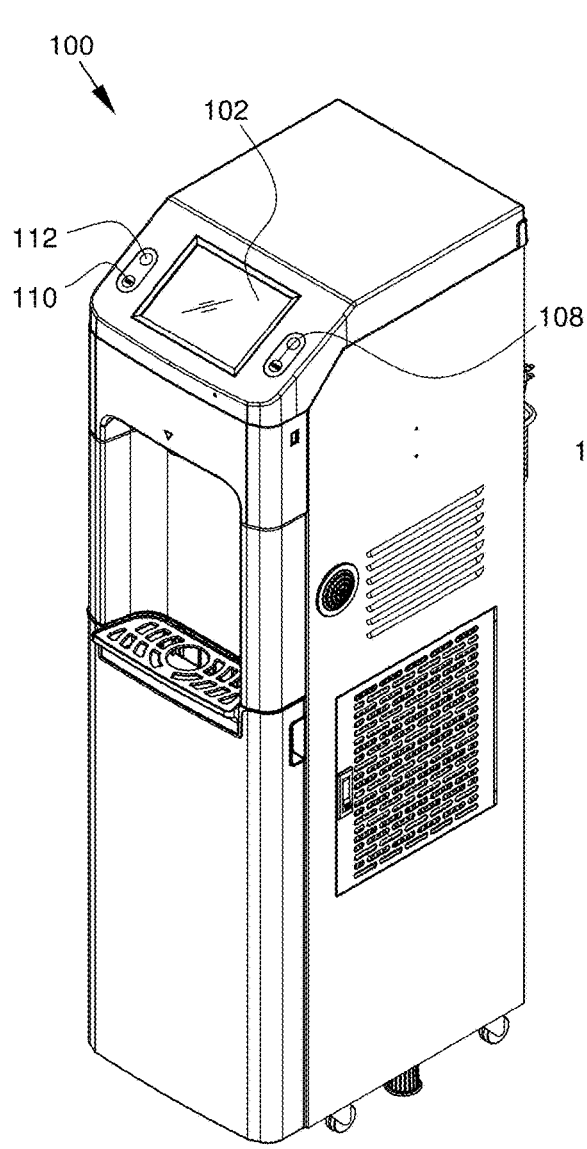
FIG. 2 is a diagrammatic perspective view of one example AWG system in accordance with the present invention.
Figure 3:
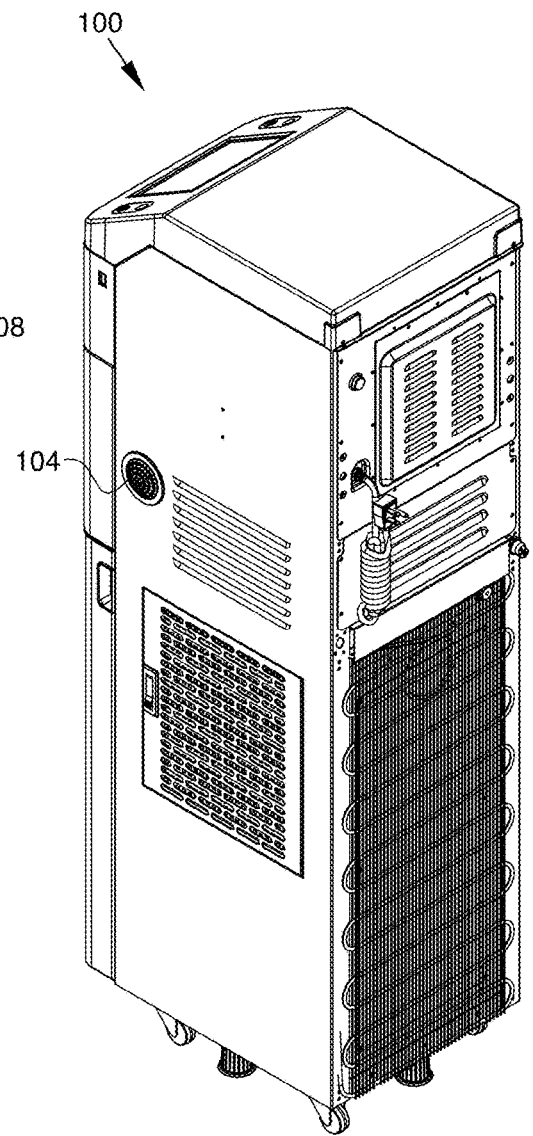
FIG. 3 is a further diagrammatic perspective view of the system of FIG. 2.

According to certain aspects of the present invention, portable AWGs, such as the one shown at 100 in FIGS. 1 and 2, are provided that include a cabinet having an exterior portion and an interior portion, with the interior portion of the cabinet being configured to house a dehumidification subsystem adapted to deposit water collected from the atmosphere into a reservoir. The AWGs include a cold tank; at least one hot tank, which is connected to at least one heating element (coil) that is configured to heat the water that is contained within the hot tank; and a central processing unit (CPU), which is programmable by a user through a control panel on the AWG. The CPU is configured to communicate with the heating element and to cause power to be delivered to the heating element according to a defined protocol.

The invention provides that such protocol may specify, among other things, (i) the frequency and magnitude of pulsed energy (as opposed to a constant stream of energy) to be delivered to the heating element from a power source (to heat the water contained in the hot tank); and (ii) a set temperature, or a set range of temperatures, for water contained within the hot tank and cold tank.

According to further aspects of the present invention, the CPU or MCU may be programmed to execute other protocols as well. For example, another defined protocol may specify a rest period for the AWG, with the rest period being a period of time during which the set temperature, or the set range of temperatures, for water contained within the hot tank is reduced relative to the set temperature(s) for a normal operating period of time (when the temperature may be held at an elevated temperature, when the AWG is more likely to be used). Still further, the invention provides that the defined protocol may specify whether (a) the set temperature, or the set range of temperatures, for water contained within the hot tank takes precedence over water contained in the cold tank; or (b) the set temperature, or the set range of temperatures, for water contained within the cold tank takes precedence over water contained in the hot tank. This setting will cause the CPU to prioritize how energy is used, when the water temperatures in both the hot and cold tanks fall outside of the defined and desired ranges.

According to yet further aspects of the invention, the defined protocol may further specify a total power usage limitation for the AWG, including the frequency and magnitude of each pulse of energy provided to a hot and cold tank, as well as the aggregate maximum power usage over a period of time.

The invention provides improved devices and methods for conserving energy that are used to maintain cold and hot water temperatures in the types of water (and beverage) AWGs described herein. The invention provides that such energy preservation features are particularly important in those countries that place strict limits on the amount of energy that a home or office is allowed to use (or in areas where the amount of energy that can be used at any given time is lower than, for example, 1200 watts). In addition to energy preservation, the invention provides that maintaining the elevated temperature in a hot tank through periodic pulses of energy, as described herein, also reduces (or eliminates) unwanted "kettle noise," which is otherwise associated with conventional heaters for hot tanks.

Aspects of the present invention relate to certain devices and methods for controlling the heating and cooling of water, which is contained within portable AWGs. In order to properly understand the context in which these devices and methods of the present invention are employed, the following will provide a brief description of a non-limiting example of the type of AWG that may be used in connection with the present invention.

According to certain embodiments of the invention, devices and methods for controlling the heating and cooling of water may be used in the context of AWGs. For example, the AWG may include an exterior cabinet; an interior space that is configured to house a dehumidification subsystem (see, for example, 114 and 116 in FIG. 5) in fluid communication with a condensed water reservoir 118; a cold water tank 126 and means (e.g., actuator buttons 108) for dispensing cold water from such tank; and a hot water tank and means (e.g., actuator button 110) for dispensing water from such hot tank 128. The cold tank 126 may be connected to an evaporator that is configured to cool the water that is contained within the cold tank, and the hot tank 128 may be connected to at least one heating element (e.g., a heating coil) that is configured to heat the water contained therein.

Figure 4:
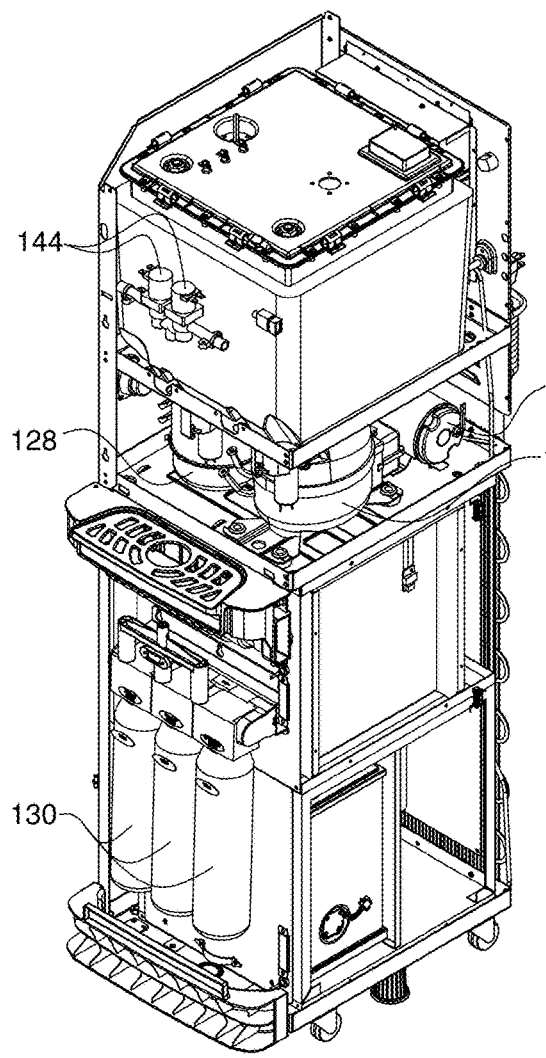
FIG. 4 is a diagrammatic perspective view illustrating various internal components of the system of FIG. 2.

The AWGs may further include one or more flow sensors, which monitor the flow of water into, and volumes of water contained within, the cold and hot water tanks of the AWG. Embodiments of the invention may provide that the AWGs will include a series of internal tubes/channels, which are configured to transfer water from a condensed water collection reservoir (or "collection tank") 118 into a cold tank 126, and from the cold tank into a hot tank 128. Similarly, the invention may provide that the AWG will include one or more pumps (see, for example, 122 in FIGS. 4 and 5), which can be operated to force water to travel from the collection tank 118 into a cold tank 126, and from the cold tank 126 into a hot tank 128.

According to certain preferred embodiments of the present invention, devices and methods for heating and cooling the water that is contained within the AWGs that are described herein are provided. In general, the present invention may comprise: a central processing unit (CPU), a control panel, a heating control module, a cooling control module, at least one temperature sensor installed within the inner portion of the hot tank 128, and at least one temperature sensor installed within the inner portion of the cold tank 126. The invention may provide that the central processing unit will be operably connected to a control panel, whereby a user may submit instructions to the central processing unit through the control panel (such as interface 102). The central processing unit and control panel may, in turn, be configured to operate and communicate with the temperature sensor located in the hot tank, the temperature sensor located in the cold tank, the input end of the heating control module, and the input end of the cooling control module. The embodiments may further provide that the output end of the heating control module is operably connected with the AWG heater (i.e., at least one heating coil), whereas the output end of the cooling control module is operably connected with the AWG cooling device (e.g., an evaporator).

Certain embodiments may provide that the control panel will include a user interface, which allows users to selectively control the heating and cooling settings of the AWG. More particularly, the invention may provide that the temperature sensor disposed within the hot tank 128 will monitor, and convey to the central processing unit, the water temperature in the hot tank. Similarly, the embodiments may provide that the temperature sensor disposed within the cold tank will monitor, and convey to the central processing unit, the water temperature in the cold tank. As described further below, the central processing unit may be configured to compare actual water temperatures to the desired temperatures that are selected by the user (at a given point in time) and, if necessary, issue instructions to the AWG heater and cooler to adjust the amount of energy that is provided to such tanks for the purpose of heating or cooling, as applicable, the water contained therein, until the selected desired temperatures and actual water temperatures are aligned—or substantially aligned within a defined range (as described further below).

According to certain preferred embodiments, the invention may provide that a user may control whether the hot water temperature or cold water temperature should take precedence over the other. For example, if the user specifies (through the control panel) that the temperature of the hot water should take priority over the temperature of the cold water, and if the actual water temperatures in both the hot tank and cold tank fall outside of a defined range from the selected temperature settings, the central processing unit will instruct the heater to heat the water in the hot tank through the heating control module until the actual water temperature in the hot tank is within a defined range from the selected temperature setting (and, once the desired hot water temperature is achieved, the central processing unit may then instruct the cooling unit to cool the water in the cold tank through the cooling control module until the actual water temperature in the cold tank is within a defined range from the selected temperature setting). Conversely, if the user specifies (e.g., through the control panel) that the temperature of the cold water should take priority over the temperature of the hot water, and if the actual water temperatures in both the hot tank and cold tank fall outside of a defined range from the selected temperature settings, the central processing unit may first adjust the water temperature of the cold tank as described above, before moving on to adjust the water temperature in the hot tank.

Preferably, however, the invention may provide that the heating and cooling units will work separately, and not simultaneously, to adjust water temperatures, which serves to reduce the total working power (and energy) that is consumed by the AWGs of the present invention. In addition, embodiments may provide that users may define the working (heating and cooling) hours of the AWG, through the control panel. The central processing unit may receive, store, and utilize such defined parameters, in combination with an internal clock, to manage when the AWG will function to heat and cool the water contained therein (and when it will not).

According to further preferred embodiments, the invention may provide that the heating control module is preferably configured to adjust (or maintain) the temperature of water contained in the hot tank by supplying abbreviated pulses (or bursts) of energy to the heating element (coil). More particularly, the central processing unit and heating control module are preferably configured to heat the water contained in the hot tank through short bursts of energy being provided to the heating element that heats the water, instead of a constant stream of energy. In some embodiments, when the water contained in the hot tank must be elevated, the magnitude of each energy burst may be increased and/or the frequency of such energy bursts may be increased—and, when the temperature must be quickly elevated, the heating control module may readjust and deliver a constant (full power) stream of energy. However, when the AWG is in a "resting state" (with the timing and duration of such "resting state" specified by a user through the control panel), or once the water temperature in the hot tank has reached the desired temperature, the water temperature may thereafter be maintained by supplying a periodic pulse of energy as described above.

Particular embodiments may provide that such features dramatically reduce the total energy consumption of these AWGs, while still having the ability to maintain water temperatures within a desired range. For example, when the maximum wattage usage is set at 1200 watts, the AWG may be programmed (e.g., through the control panel) to only use 300 watts during a "resting state" (e.g., during the evening hours, when the AWG is not being used), or once the water temperature in the hot tank has reached the desired temperature. When and if a cup of hot water is drawn from the AWG, the central processing unit may, if necessary, instruct the heating control module to supply a full stream of energy to quickly heat the water in the hot tank in such instances and, after the beverage is dispensed, return to a "resting state" protocol. This energy preservation feature is particularly important in those countries that place strict limits on the amount of energy that a home or office is allowed to use (or in areas where the amount of energy that can be used at any given time is lower than in many other countries, e.g., lower than 1200 watts). In addition to energy preservation, the invention may provide that maintaining the elevated temperature in the hot tank through periodic pulses of energy also reduces (or eliminates) unwanted "kettle noise," which is otherwise associated with conventional heaters for hot tanks.

Heating Control Logic and Processes

The above-described energy saving methods can be implemented through the use of fuzzy logic proportional-integral-derivative (PID) controllers, which utilize a variable pulse control heating algorithm. More particularly, the central processing unit described herein is configured to drive the various parameters of a PID controller, namely, the proportional (P), integral (I), and derivative (D) values. Such controller is used for the purpose of adjusting the wattages provided to the heating element (coil) used in the AWG, in a manner that conserves the expenditure of energy, yet is adapted to heat water in accordance with the present invention.

Figure 13:
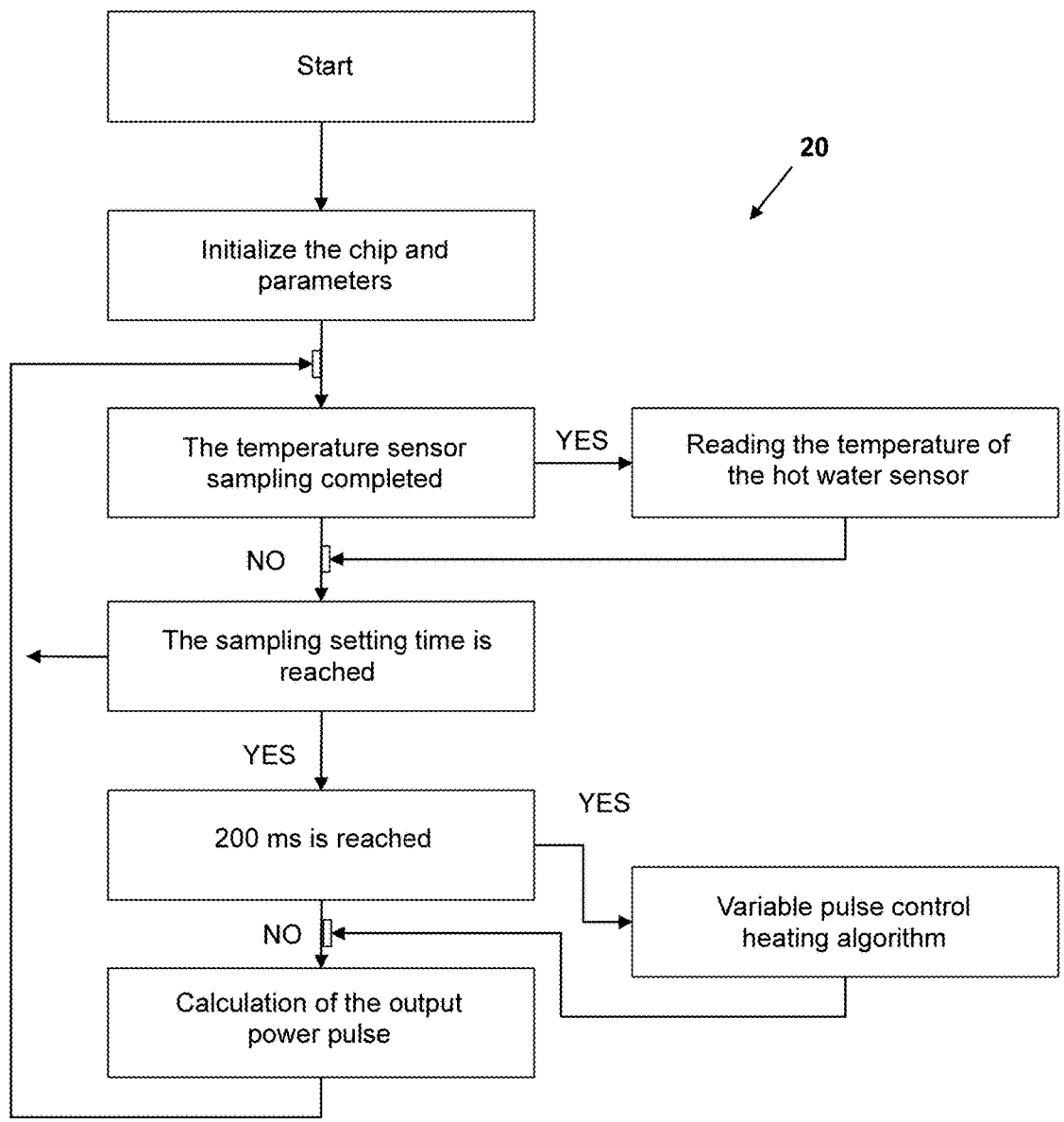
FIG. 13 is a flow diagram that illustrates the logic and functionality of the heater control algorithm described herein, wherein an overview is displayed to the user with water-related facts and further information on how to interact with generator.
Figure 14:
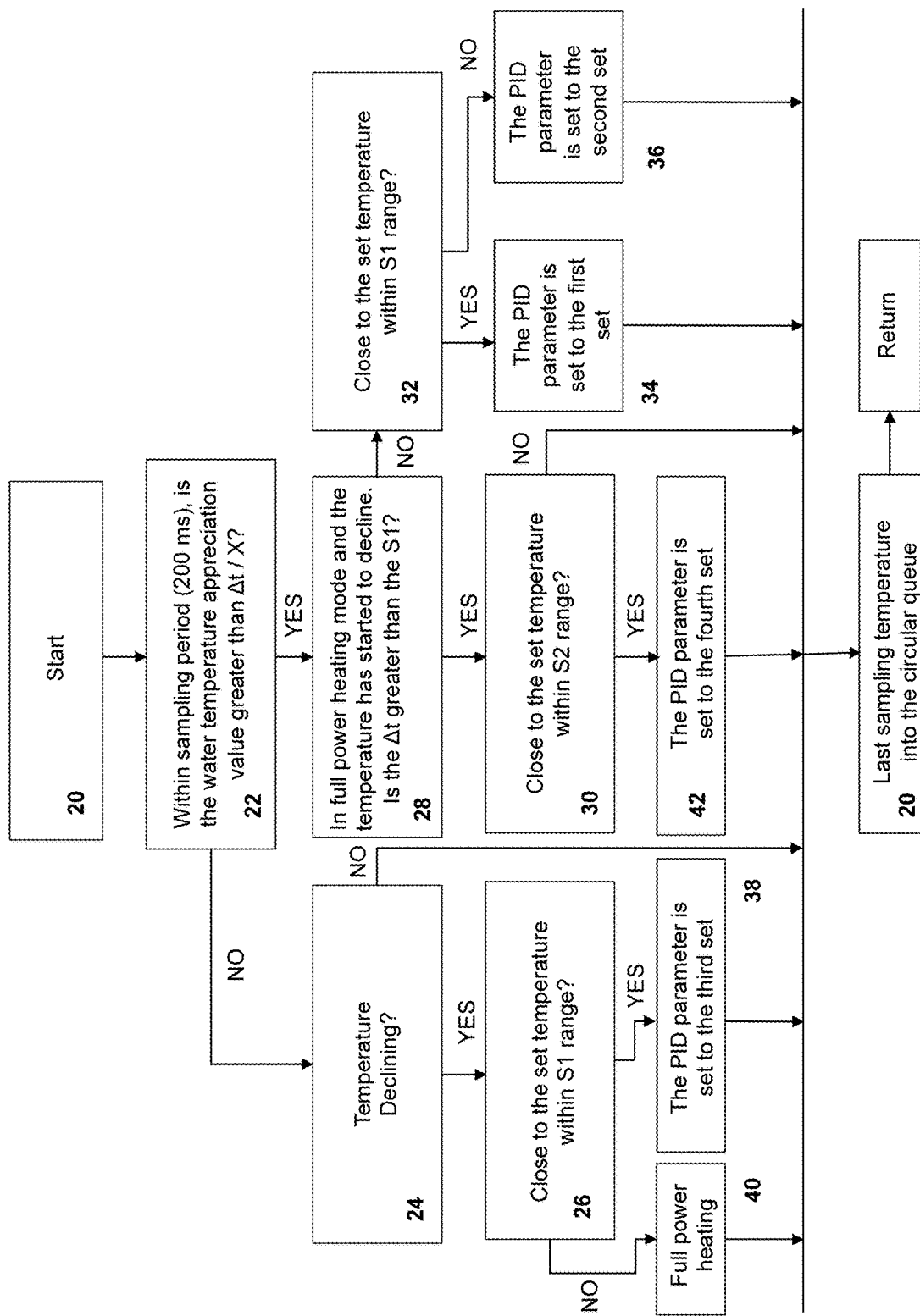
FIG. 14 is a flow diagram that illustrates the logic and functionality of the variable pulse control heating algorithm described herein.
Figure 15:
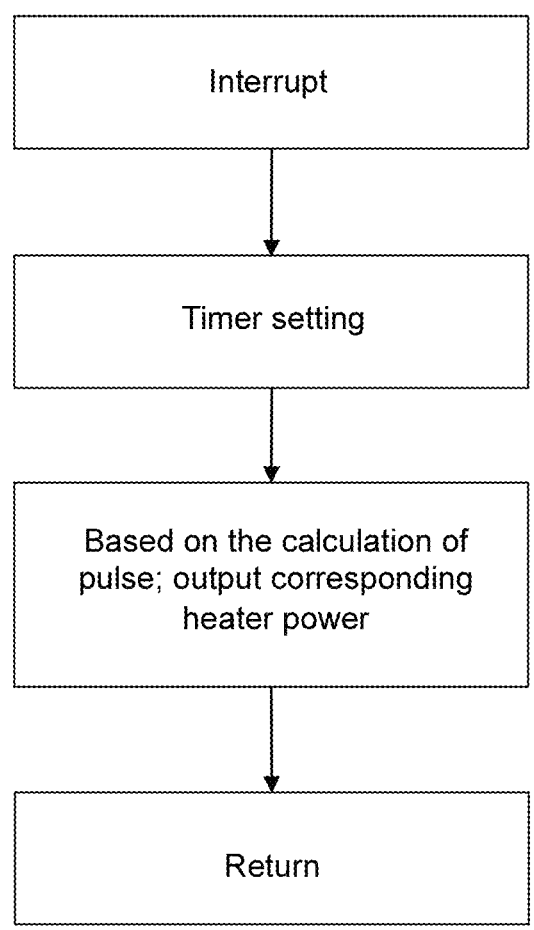
FIG. 15 is a flow diagram that illustrates the logic and functionality of the heating power output interrupt mode described herein.

As used herein, the delta temperature (Δt) value represents the difference between the desired set temperature (as specified by a user through the control panel) and the actual temperature of the water. Referring now to FIGS. 13 and 14, the first step 20 of the water temperature controlling procedures described herein may involve a temperature sensor obtaining the actual water temperature in the hot tank, and then communicating such information to the central processing unit (CPU). Next, the CPU determines if the appreciation of the water temperature is greater than Δt/X in a sampling period (e.g., 200 ms) 22, whereby X is the default temperature coefficient (a non-limiting example of such coefficient is X=15). As used herein, the term "appreciation" of the water temperature refers to the change (e.g., rise) in water temperature over a specified period of time.

Referring to FIG. 14 for illustration, the invention may provide that if the CPU determines 22 that the appreciation of the water temperature within the sampling period is greater than Δt/X, then the current water temperature has started to decline. If and when the AWG is operating in full power mode, the CPU next determines 28 if the Δt value is greater than an S1 setting (with S1 being the first adjustment temperature differential setting, as described further below). If the Δt value is not greater than an S1 setting, then the CPU determines if the actual water temperature is close (within the S1 setting range, i.e., less than or equal to the S1 setting) to the desired set temperature 32. If the actual water temperature is close (within the S1 setting range) to the desired set temperature, then the PID parameters are adjusted to a "first set" 34, as described below; whereas, if the actual water temperature is not close (within the S1 setting range) to the desired set temperature, then the PID parameters are adjusted to a "second set" 36, as described below. In both instances, after the PID parameters are adjusted to the first set 34 or second set 36, the heating control logic will then restart after a defined period of time.

If the Δt value is determined to be greater than the S1 setting 28, then the CPU instructs the heating element to activate to full power heating. In addition, the CPU determines 30 if the Δt is less than or equal to S2 (with S2 being the second adjustment temperature differential setting). If the Δt is less 16 than or equal to the S2 setting, then the PID parameter is set to the "fourth set" of PID parameters 42, and the heating control logic will then restart after a defined period of time. If the Δt is greater than the S2 setting, then the heating control logic will then restart.

The invention may provide that if the CPU determines 22 that the appreciation of the water temperature within the sampling period is not greater than Δt/X, the CPU will determine if the current water temperature has started to decline 24. If not, then the heating control logic will restart after a defined period of time. If the CPU determines that the current water temperature has started to decline 24, then the CPU determines 26 if the actual water temperature is close (within the S1 setting range) to the desired set temperature. More particularly, the CPU will determine 26 if the Δt is less than or equal to the S1 setting. If the CPU determines that the Δt is less than or equal to the S1 setting, then the PID parameter is set to a "third set" of parameters 38, as described further below, and the heating control logic will then restart after a defined period of time. If the CPU determines that the Δt is more than the S1 setting, the CPU instructs the heating element to activate to full power heating 40, and the heating control logic will then restart after a defined period of time.

The invention may provide that the CPU may be programmed with any combination of desired first (S1) and second (S2) adjusting temperature difference settings. Preferably, however, the invention provides that the first (S1) setting is less than the second (S2) adjusting temperature difference setting. In certain exemplary embodiments, the invention provides that the first setting (S1) is 32.9 Fahrenheit, whereas the second setting (S2) is 33.8 Fahrenheit. Similarly, the invention provides that the CPU may be programmed with the desired PID parameters and, optionally, being changed as desired. In certain exemplary embodiments, the invention provides that the PID parameters, referenced above, include those shown in the table below.

|  | P value | I value | D value |
|---|---|---|---|
| First Parameters | 15 | 2 | 185 |
| Second Parameters | 40 | 10 | 255 |
| Third Parameters | 10 | 4 | 200 |
| Fourth Parameters | 35 | 82 | 250 |

Circuits for Controlling the Heating and Cooling of Water

The invention may further encompass certain novel circuitry, which may be used to construct and employ the devices and methods described above. The beneficial attributes of the circuitry described herein include: (1) that it can bifurcate heating and cooling operations for the AWGs described herein (based upon the needs and parameters specified by users), (2) that it is configured to reduce the working power of such AWGs and lower the net electricity load of the AWGs; and (3) it is configured to control the operations of heating and cooling elements, in accordance with defined hours (including heating and cooling hours) specified by a user through the control panel (which also conserves energy).

Figure 16:
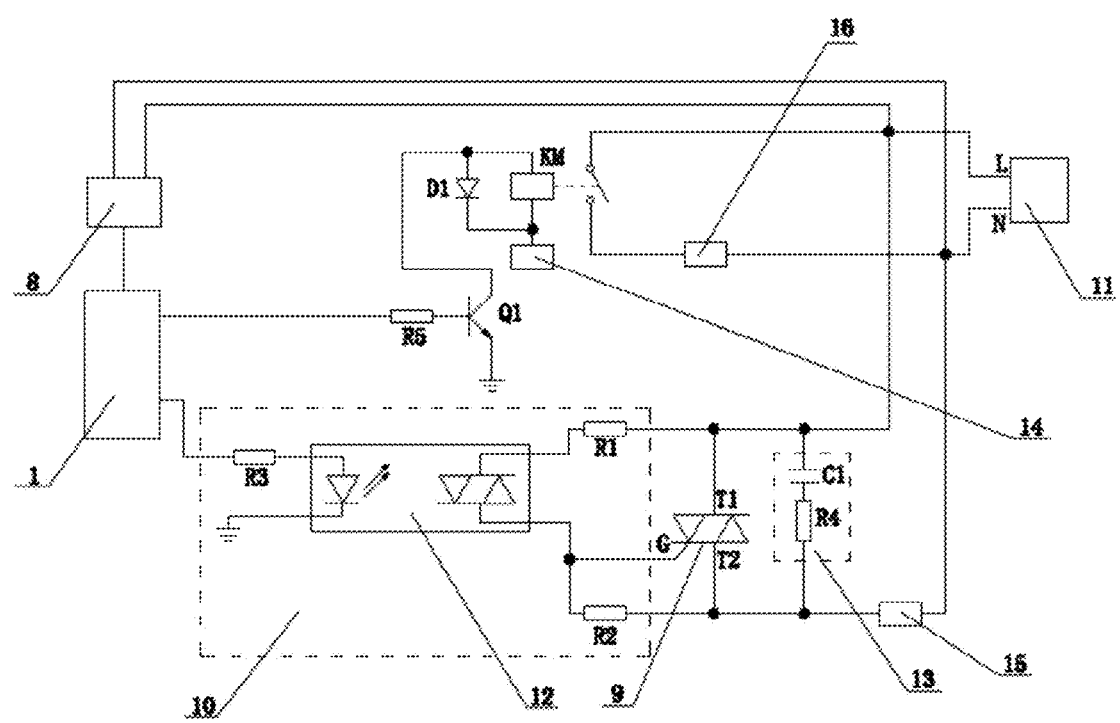
FIG. 16 is a diagram that illustrates a circuit, which is useful for the heating and cooling control modules described herein.

More specifically, and referring now to FIG. 16, the invention may provide that the heating control module will preferably employ an over zero testing module 8, dual-direction controllable silicon 9, a first control module of dual-direction controllable silicon 10, and a second control module of dual-direction controllable silicon 10, which includes a photoelectricity coupling dual-direction controllable silicon drive 12, resistor R1, resistor R2, resistor R3, and a surge absorbing circuit 13 (which includes capacitor C1 and resistor R4). The invention provides that two input terminals of the over zero testing module 8 are connected with a firing line L of an AC power source 11 and a zero line N. Still further, the invention may provide that the output terminals of the over zero testing module 8 are connected with input terminals of the central processing unit.

Still referring to FIG. 16, the invention may provide that an anode of a transmitting end of the photoelectricity coupling dual-direction controllable silicon drive 12 will be connected with a first output end of the central processing unit via resistor R3. The invention provides that the cathode transmitting end of the photoelectricity coupling dual-direction controllable silicon drive 12 will be connected with the ground, while the receiving end of the photoelectricity coupling dual-direction controllable silicon drive 12 is connected with the first anode T1 of the dual-direction controllable silicon 9 via resistor R1. The invention may provide that the other end of the photoelectricity coupling dual-direction controllable silicon drive 12 is connected with an end of resistor R2 and control pole G of the dual-direction controllable silicon 9, while the other end of resistor R2 is connected with the second anode T2 of the dual-direction controllable silicon 9. The invention provides that an end of the capacitor C1 is connected with the first anode T1 of the dual-direction controllable silicon 9 and fire line L of AC power source 11, while the other end is connected with an end of resistor R4 (and the other end of resistor R4 is connected with the second anode T2 of the dual-direction controllable silicon 9 and a first end of heater 15, with the other end of heater 15 being connected with the zero line N of the AC power source 11).

As explained above, the invention provides that users may define working power parameters of the heater 15 (e.g., heating coil) via the control panel. The over zero testing module 8 will test a zero point of the AC power source 11, and send a trigger pulse to the central processing unit every half AC period. The invention provides that the central processing unit is configured to adjust the working power of the heater 15 by modulating the conducted AC power wave of the dual-direction controllable silicon 9 and disconnected AC power wave per second. The invention provides that the photoelectricity coupling dual-direction controllable silicon drive 12 will be effective to isolate electricity; the resistors R1 and R3 are configured to limit electricity flow; and resistor R2 will be configured to prevent dual-direction controllable silicon 9 from false triggering. The invention provides that the surge absorbing circuit 13 will be configured to prevent surge voltage from damaging the dual-direction collectable silicon 9.

Still referring to FIG. 16, the invention provides that the cooling control module will include a relay KM, transistor Q1, diode D1 and resistor R5. The invention provides that the second output end of central processing unit will be connected with transistor Q1 via resistor R5, with the transmitting end of transistor Q1 being connected with the ground. The invention provides that the collector of transistor Q1 will be connected with the anode of diode D1 and one circle end of the relay KM, with the other circle end of relay KM being connected with the cathode of diode D1 and the DC power source 14 of the AWG. The invention provides that the end of the opening point of the relay KM will be connected with the firing wire L of the AC power source 11, with the other end being connected with one end of the cooler 16, with the other end of cooler 16 being connected with a zero line N of the AC power source 11.

According to these embodiments, the invention provides that when the second output end of the central processing unit outputs an elevated amount of electricity, transistor Q1 is conducted, the relay KM circle is connected with electricity, the opening point of relay KM is closed, and the cooler 16 starts operating. Similarly, when the second output end of the central processing unit outputs a reduced amount of electricity, transistor Q1 is 21 disconnected, the relay KM circle is disconnected with electricity, the opening point of relay KM is opened, and the cooler 16 is deactivated.

To help maximize water production while minimizing energy consumption, embodiments of the present invention may contain an electrical and/or mechanical metering system which will allow for maximum water production while minimizing energy consumption under the widest possible range of ambient temperature and humidity conditions. Such a metering system, may, for example, respond to the ambient conditions and cause the flow of refrigerant in the dehumidification process to decrease or increase in response to those ambient conditions. Such a metering system may constantly change the discharge pressure and suction pressure of the refrigerant to match the prevailing dew point of the ambient temperature and humidity fluctuations. By way of example, if the ambient temperature and humidity levels are low, the metering system will increase the flow rate of the refrigerant, which will in turn increase the discharge pressure, which will increase the suction pressure in the system, which will result in continuation of the dehumidification process without causing the temperature of the evaporative coils to drop below the freezing point of water. Conversely, if the ambient conditions (e.g., temperature and relative humidity) are high, the metering system will reduce the flow of refrigerant, thereby allowing for the dehumidification process to proceed using less energy. Therefore, the metering system allows for significantly greater energy efficiency on the higher and lower ends of the ambient condition spectrum.

Standard devices for air-to-water generation typically require control to be initiated locally at the physical device, and have limited monitoring capability, which if available is also typically only available at the location of the physical device. Certain preferred embodiments of the present invention allow for remote control and monitoring of the device via wireless and cellular communication. In particular such embodiments, the control of the device can be performed remotely from other electronic devices, and the machine's logs and statistics may, for example, be read from any location. This further allows such embodiments to interact with internet-based platforms to include publishing of statistics to internet publishing and social media platforms, as well as the ability to use the data for game behavior and game interaction. Such published data and game behavior may include the ability for users of an embodiment to post their statistics in public for a and to use those statistics to compete with other users on metrics such as total water consumed, total beneficial impact to social or environmental causes, and energy efficiency in water production and consumption. Respective game applications may include the ability to use graphical representations to demonstrate goal achievement, and use of statistical data as a resource to trigger actions in a game environment (e.g. fuel for a game version of a race car, player turns for a virtual board game, or player lives in a challenge). Game data would be fully integrated with the embodiment so the user could either play the games within the machine itself (e.g., with global connection to other players via wireless or cellular communication, or the like) or on a separate device such as a personal computer, tablet, interactive television, or phone device.

Certain preferred embodiments of the present invention use a series of high-quality cleaning and filtering processes, each with a very specific function. Before the air enters the generator 100, it may preferably pass through an electrostatic air filter, which traps and blocks any large airborne particles. As the water in the air condenses, it typically passes through a collection filter that removes any large particles. As the water collects in the storage tank 118, it may preferably be treated with natural ozone, or 03, to immediately disinfect the source water and prevent bacteria from growing inside the collection area. The water may then move through a sediment filter, which removes any large particles or contaminants from the water. Next the water may pass through a carbon filter, which removes additional particles and ensures that the water tastes fresh and clean. The water may then move through an ultrafine membrane filter, containing an extraordinarily fine, overlapping mesh to eliminate the smallest impurities. Finally, the water may pass through an Ultraviolet light sterilization station to eradicate any remaining microorganisms, including bacteria, viruses, molds, and other pathogens. After the water has been filtered and is ready for drinking, the generator 100 may continue to treat the water storage tanks (e.g., reservoir 118 and cold tank 126) with ozone to ensure that no pathogens can be introduced into the user's water before it is dispensed.

Preferred embodiments of the present invention are adapted to attract users, detect users, engage and inform the users, and reconnect with the users. Connecting the generator to the local Wi-fi network or via blue tooth opens up numerous ways to attract users to the generators. Mobile alerts and notifications can be used to bring all users to the product based on the users' consumption settings/patterns/schedules. In particular embodiments, if a mobile app is in proximity to the generator, the closest user may be auto logged in based on their privacy settings/preferences. In such embodiments, based on the user's pre-set water temperature preferences, for example Hot (mid, low, high) or Cold (mid, low, high) when the product's physical button is clicked, the desired water preference may be poured into their held vessel. Additionally, privacy settings could also include social media account login for viral messaging of brand awareness experience.

In terms of engaging and informing the user, the dashboard experience preferably presents an overall status of water usage. Until the user interacts with the product or application on the product, a screensaver mode may be displayed with rotating facts and information. Embodiments with gamification features may involve, for example, a water fact based interactive trivia game, with at least 4 questions. If answered correctly, options to be added to a leaderboard, and spread socially (e.g., via social media) along with a brand message being presented. A game feature may also give an additional reason for less health-conscious users to engage.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A water dispenser system comprising:
    (a) at least one tap element configured to being in water receiving communication with a source of liquid water and being user-actuatable between an open state and a closed state, the at least one tap element being configured to allow water to be dispensed therefrom when in its open state and to prevent water from being dispensed therefrom when in its closed state, wherein:
        (i) actuation periods are respectively defined by each length of time the at least one tap element is continuously in its open state, and
        (ii) actuated volumes of water are respectively defined by the volume of water dispensed during each actuation period; and
    (b) a computer element configured to:
        (i) register multiple registered users of the water dispenser system;
        (ii) record respective said actuated volumes dispensed by the registered users;
        (iii) sum the recorded actuated volumes dispensed throughout respective user dispensing periods, thereby defining respective user aggregate volumes; and
        (iv) convey respective said user aggregate volumes to the registered users.

2. The water dispenser system as defined in claim 1 in which the user aggregate volumes are conveyed in the form of at least one of:
    (a) one or more standard units of volume measurement;
    (b) a degree of progress toward a pre-set goal of the respective registered user;
    (c) a degree of progress toward a pre-set group goal of a group of the respective registered users; or
    (d) a number of hypothetical plastic containers of pre-determined volumetric capacity which are collectively volumetrically equivalent to the respective user aggregate volume.

3. The water dispenser system as defined in claim 1 in which the computer element includes a display screen, and the conveying of user aggregate volumes is completed at least by way of displaying the respective aggregate volumes on the display screen.

4. The water dispenser system as defined in claim 3 in which the display screen is a touch screen interface.

5. The water dispenser system as defined in claim 1 further comprising one or more sensor elements configured to measure one or more of the ambient temperature, ambient pressure or ambient humidity;
    wherein the computer element is in data communication with the one or more sensor elements and is configured to:
        (a) calculate from the data a current rate at which the water dispenser system is able to produce liquid water from the ambient air; and
        (b) display the rate on a display screen.

6. The water dispenser system as defined in claim 1 further comprising a network interface configured to enable the computer element to communicate with at least one of a local area network, a wide area network, a cellular network, a peer-to-peer mesh or a satellite.

7. The water dispenser system as defined in claim 6 in which the communication is or includes wireless communication.

8. The water dispenser system as defined in claim 6 in which the computer element includes a display screen and is configured to receive by way of the network interface for display on the display screen at least one or more of:
    (i) educational or motivational messages relating to water use;
    (ii) educational or motivational messages relating to water conservation;
    (iii) graphics, messages or promotions relating to a brand; or
    (iv) service notifications.

9. The water dispenser system as defined in claim 6 in which the conveyed user aggregate volumes are accessible by social media accounts of respective registered users.

10. The water dispenser system as defined in claim 6 in which the conveyed user aggregate volumes are conveyable as data inputs to at least one of:
    (a) a computer-based game playable by one or more registered users wherein the respective aggregate volumes at least one of:
        (i) trigger events within the game; or
        (ii) represent parameters within the game; and
    (b) a computer-based competition between registered users wherein the respective aggregate volumes of the competitors are used as a basis of mutual performance comparison.

11. The water dispenser system as defined in claim 6 in which the conveyed user aggregate volumes are accessible by mobile computing devices of respective registered users.

12. The water dispenser system as defined in claim 11 in which the accessibility is by way of an intermediate server element.

13. The water dispenser system as defined in claim 1 in which at least one of the user dispensing periods is the portion of the current calendar day which has elapsed as of the latest dispensing by the respective registered user.

14. The water dispenser system as defined in claim 1 in which the computer element includes a machine counter which is configured to be reinitialized, at least one of the user dispensing periods being equivalent to the time which has elapsed since latest reinitialization.

15. The water dispenser system as defined in claim 1 in which at least one of the user aggregate volumes corresponds to the dispensing by all users of the water dispenser system.

16. The water dispenser system as defined in claim 1 further comprising a flow measurement element for use in determining the actuated volumes of water, the flow measurement element being comprised of one or more flow sensors or flow meters respectively disposed in fluid communication between the one or more tap elements and one or more corresponding potable water tanks.

17. The water dispenser system as defined in claim 1 wherein the computer element is configured to be placed in network communication with computer elements of one or more additional said water dispenser systems located at other locations, each of the computer elements being configured to receive respective potable water availability data from each of the other water dispenser systems, and indicate potable water availability and location information corresponding to each of the other water dispenser systems.

18. The water dispenser system as defined in claim 1 in which the registering of one or more registered users enables the registered users to create respective user hydration profiles with associated user names, each user hydration profile including respective user hydration data which:
    (a) is accessible by the respective registered user by logging into their hydration profile using a unique authentication identification, and
    (b) tracks respective user aggregate volumes conveyed in the form of at least one of:
        (i) one or more standard units of volume measurement;
        (ii) a degree of progress toward a pre-set goal of the respective registered user; or
        (iii) a number of hypothetical plastic containers of pre-determined volumetric capacity which are collectively volumetrically equivalent to a respective user aggregate volume.

19. The water dispenser system as defined in claim 18 in which the authentication identification is readable by the computer element by way of the respective user's entry of a passcode.

20. The water dispenser system as defined in claim 18 in which the authentication identification is readable by the computer element by way of biometric sensing.

21. The water dispenser system as defined in claim 18 in which the authentication identification is readable by the computer element by way of radio frequency identification (RFID) tag or near field communication (NFC) tag.

22. The water dispenser system as defined in claim 21 in which the RFID or NFC tag is embedded or contained in a drinking vessel of the respective user.

23. The water dispenser system as defined in claim 1 wherein:
    (a) the water dispenser system includes one or more dynamic components;
    (b) each of the one or more dynamic components has a respective active state which results in a respective acoustic signature audible to humans; and
    (c) the computer element is programmable with a noise control schedule, the noise control schedule being configured to include times when one or more of the dynamic components are automatically maintained in a respective reduced activity state or inactive state.

24. The water dispenser system as defined in claim 23 in which the one or more dynamic components are one or more of a fan element, a compressor element and a pump element.

25. The water dispenser system as defined in claim 23 wherein the noise control schedule is user-modifiable by way of a touch screen interface.

26. The water dispenser system as defined in claim 1 further comprising:
    (a) a collection reservoir configured to receive liquid water from a source of liquid water and temporarily store a quantity thereof; and
    (b) an ozone generator configured to generate ozone gas routable to the collection reservoir by way of an ozone conduit;
    (c) a cold water tank in fluid communication with the collection reservoir, the ozone gas being further routable to an upper portion of the cold water tank by way of the ozone conduit; and
    (d) a pressure equalization valve for proportioning the ozone gas routed to the collection reservoir and the cold water tank.

27. A system comprising:
    (a) a multiplicity of water dispenser systems, the water dispenser systems each comprising:
        (i) at least one tap element configured to be in water receiving communication with a source of liquid water and being user-actuatable between an open state and a closed state, the at least one tap element being configured to allow water to be dispensed therefrom when in its open state and to prevent water from being dispensed therefrom when in its closed state, wherein:
            actuation periods are respectively defined by each length of time the at least one tap element is continuously in its open state, and actuated volumes of water are respectively defined by the volume of water dispensed during each actuation period; and
        (ii) a computer element configured to:
            register multiple registered users of the water dispenser system;
            record respective said actuated volumes dispensed by the registered users;
            sum the recorded actuated volumes dispensed throughout respective user dispensing periods, thereby defining respective user aggregate volumes;
            convey respective said user aggregate volumes to the registered users; and
            obtain user profile data, dispense data and service data, the user profile data pertaining to one or more respective said registered users, the dispense data pertaining to one or more of the actuated volumes of water dispensed by respective said registered users, and the service data pertaining to the operation of one or more components of the water dispenser system; and (b) a server element in network communication with the computer elements and configured to receive therefrom one or more of the user profile data, dispense data and service data.

28. The system as defined in claim 27 in which the server element includes a database element for tracking the respective volumes of water dispensed by respective registered users as input to a statistical or game-based competition between competing registered users.

29. The system as defined in claim 27 in which the server element runs an application programming interface accessible by mobile computing devices of respective users.

* * * * *